United States Patent
Aso et al.

(10) Patent No.: US 10,179,360 B2
(45) Date of Patent: Jan. 15, 2019

(54) METHOD FOR PRODUCING CURVED PART, AND SKELETON STRUCTURE MEMBER OF BODY SHELL OF AUTOMOBILE

(71) Applicant: NIPPON STEEL & SUMITOMO METAL CORPORATION, Chiyoda-ku, Tokyo (JP)

(72) Inventors: Toshimitsu Aso, Tokyo (JP); Yasuharu Tanaka, Tokyo (JP); Takashi Miyagi, Tokyo (JP); Misao Ogawa, Tokyo (JP); Kazuyuki Kawano, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 711 days.

(21) Appl. No.: 14/424,032

(22) PCT Filed: Sep. 5, 2013

(86) PCT No.: PCT/JP2013/073946
§ 371 (c)(1),
(2) Date: Feb. 25, 2015

(87) PCT Pub. No.: WO2014/042067
PCT Pub. Date: Mar. 20, 2014

(65) Prior Publication Data
US 2015/0224563 A1    Aug. 13, 2015

(30) Foreign Application Priority Data
Sep. 12, 2012    (JP) .................................. 2012-200445

(51) Int. Cl.
*B21D 53/88*    (2006.01)
*B21D 22/26*    (2006.01)
(Continued)

(52) U.S. Cl.
CPC ............. *B21D 53/88* (2013.01); *B21D 22/02* (2013.01); *B21D 22/26* (2013.01); *B21D 24/02* (2013.01);
(Continued)

(58) Field of Classification Search
CPC ...... B21D 22/20; B21D 22/201; B21D 22/22; B21D 22/30; B21D 24/02; B21D 24/04;
(Continued)

(56) References Cited

U.S. PATENT DOCUMENTS 1,881,517 A  * 10/1932  Groehn .................. B21D 22/02
                                                            72/350
5,211,047 A  *  5/1993  Kaneyuki .............. B21D 11/10
                                                            72/313
(Continued)

FOREIGN PATENT DOCUMENTS

JP    S56-117831        9/1981
JP    57165125 A       10/1982
(Continued)

OTHER PUBLICATIONS

Translation, JP 2008-105094A, May 2008.*
(Continued)

*Primary Examiner* — Edward Tolan
(74) *Attorney, Agent, or Firm* — Birch, Stewart, Kolasch & Birch, LLP

(57) ABSTRACT

A curved part 10 having a hat-shaped cross section is produced by press-forming without causing cracks and wrinkles. When producing a curved part 10, which is made up of a top plate 11, vertical walls 12a and 12b extended in parallel with each other along ridgelines 14a and 14b of the top plate, and outwardly directed flanges 13a and 13b which connect to leading edges of the vertical walls, and has a generally hat-shaped cross section, by press forming, the
(Continued)

metal material sheet 601 is interposed and constrained by the die 502 and the blank holder 505 and is press-formed while the metal material sheet 601 being interposed and constrained by the pad 503 and the punch 504.

9 Claims, 35 Drawing Sheets

(51) Int. Cl.
    *B21D 35/00*     (2006.01)
    *B21D 22/02*     (2006.01)
    *B21D 24/02*     (2006.01)
    *B21D 24/04*     (2006.01)
    *B62D 25/08*     (2006.01)
    *B21D 5/01*     (2006.01)

(52) U.S. Cl.
 CPC .......... *B21D 24/04* (2013.01); *B21D 35/001* (2013.01); *B62D 25/08* (2013.01); *B21D 5/01* (2013.01); *Y10T 428/12354* (2015.01)

(58) Field of Classification Search
 CPC .......... B21D 24/06; B21D 24/08; B21D 5/01; B21D 22/02; B21D 22/26; B21D 35/001; B21D 53/88
 See application file for complete search history.

(56) References Cited

U.S. PATENT DOCUMENTS

| | | | | |
|---|---|---|---|---|
| 7,117,708 B2* | 10/2006 | Yamano | ................... | B21D 5/01 72/347 |
| 7,490,503 B1* | 2/2009 | Kanemitsu | ............. | B21D 53/18 72/348 |
| 7,596,980 B2* | 10/2009 | Kimura | ................... | B21D 19/08 72/348 |
| 9,211,579 B2* | 12/2015 | Tanaka | ................... | B21D 22/26 |
| 9,266,162 B2* | 2/2016 | Tanaka | ................... | B21D 22/02 |
| 2009/0071218 A1* | 3/2009 | Kohno | ................... | B21D 24/02 72/351 |
| 2012/0297853 A1 | 11/2012 | Tanaka et al. | | |

FOREIGN PATENT DOCUMENTS

| | | | | |
|---|---|---|---|---|
| JP | 59-73120 A | * | 4/1984 | ............... B21D 5/01 |
| JP | H10-225723 | | 8/1998 | |
| JP | 2003-103306 | | 4/2003 | |
| JP | 2004-154859 | | 6/2004 | |
| JP | 2004154786 A | | 6/2004 | |
| JP | 2005262309 A | | 9/2005 | |
| JP | 2006-015404 | | 1/2006 | |
| JP | 2006-159281 | | 6/2006 | |
| JP | 2008-018442 | | 1/2008 | |
| JP | 2008-105094 | | 5/2008 | |
| JP | 2008-307557 | | 12/2008 | |
| JP | 2009-241109 | | 10/2009 | |
| JP | 2009-255116 | | 11/2009 | |
| JP | 2012-051005 | | 3/2012 | |
| WO | WO 2011/145679 | | 11/2011 | |

OTHER PUBLICATIONS

Translation, JP 59-73120A, Apr. 1984.*
Office Action dated Jun. 24, 2014 issued in related Japanese Patent Application No. 2014-514271 [with English Translation].
Office Action dated Nov. 4, 2014 issued in related Japanese Patent Application No. 2014-514271 [with English Translation].
Form PCT/IB/345 Third Party Observation of PCT/JP2013/073946 dated Dec. 15, 2014.
Romanovsky, "Reference Book on Cold Stamping", Fifth Edition, Machine Building Publishers, Leningrad, 1971, pp. 617-622 (with an English translation thereof) 14 total pages.
Russian Office Action and Search Report dated Jun. 29, 2016 for Application No. 2015106689/02, along with an English translation of the Office Action.
Trishevsky et al., "Perforated Profiles", Metallurgia, Metallurgy Publishers, 1972, pp. 6, 7, 63-64 (with an English translation thereof), 9 total pages.

* cited by examiner

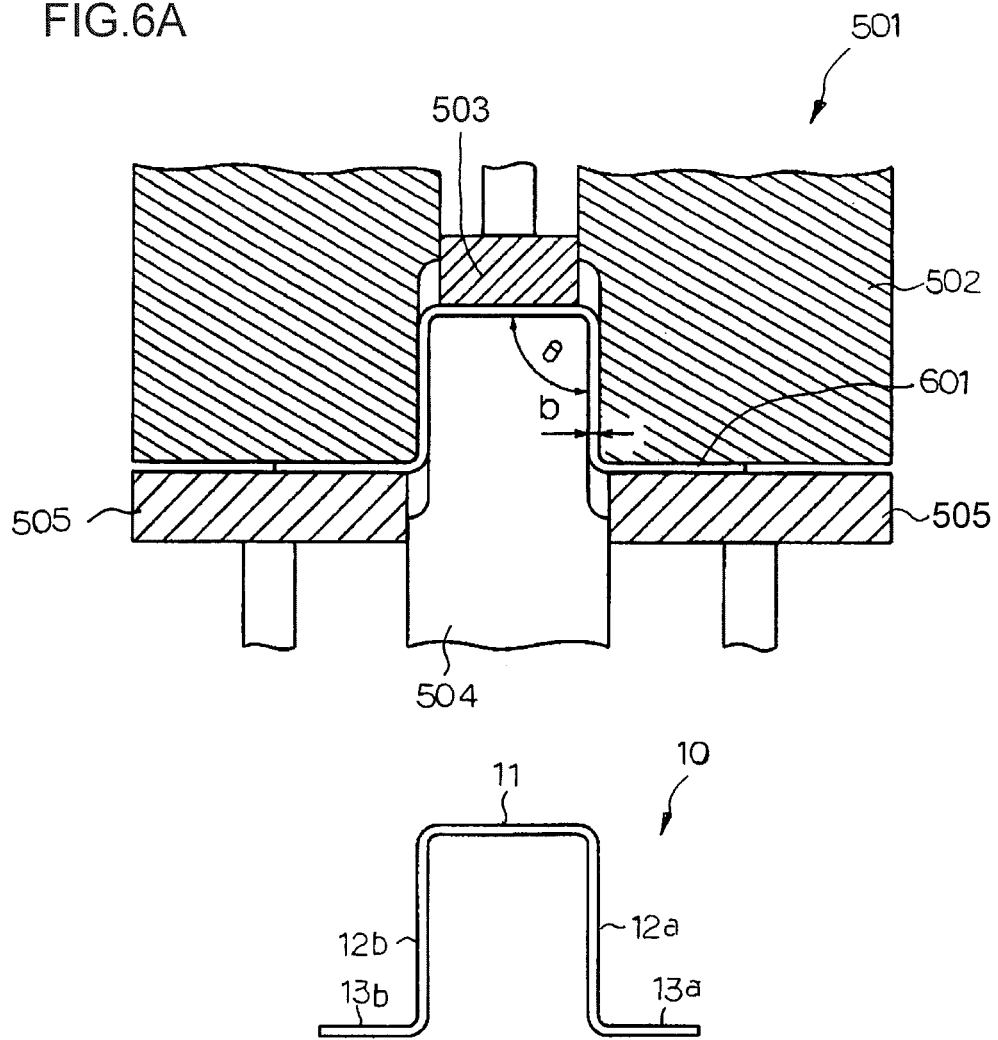

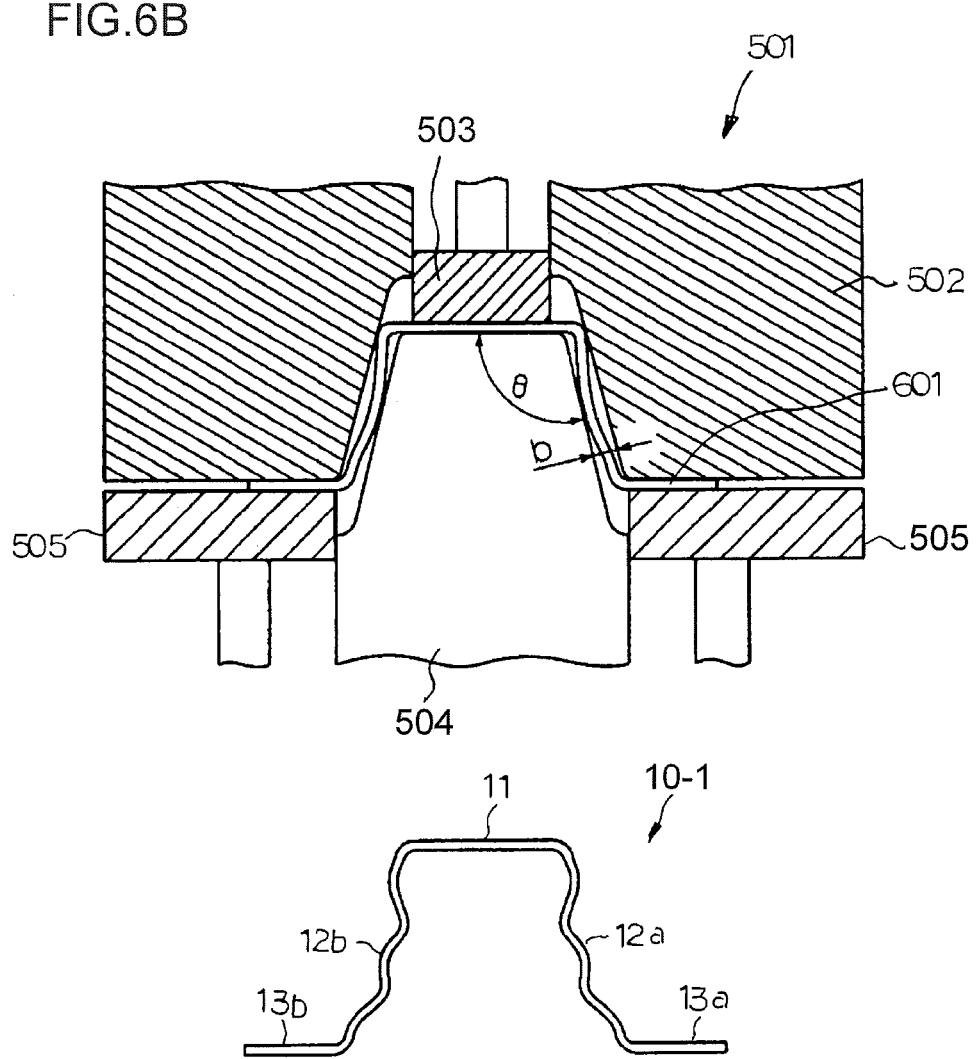

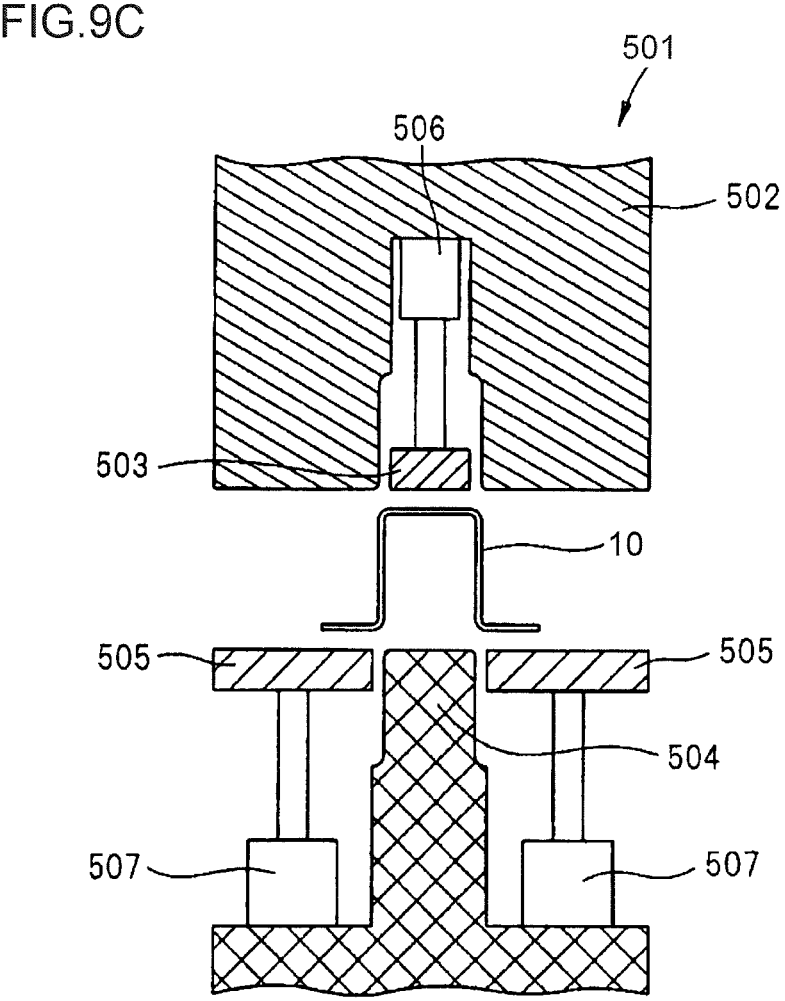

METHOD FOR PRODUCING CURVED PART, AND SKELETON STRUCTURE MEMBER OF BODY SHELL OF AUTOMOBILE

TECHNICAL FIELD

This application is a national stage application of International Application No. PCT/JP2013/073946, filed Sep. 5, 2013, which is incorporated by reference in its entirety. International Application No. PCT/JP2013/073946 claims priority to Japanese Patent Application No. 2012-200445, filed Sep. 12, 2012.

The present invention relates to a method for producing a curved part having a hat-shaped cross section by press-forming a metal material sheet, and a skeleton structure member of a body shell of automobile.

BACKGROUND ART

A press-formed part having a hat-shaped cross section and an external shape being curved in its lengthwise direction is used as a skeleton structure member of a body shell of automobile, such as a side member (a front side member and a rear side member). This press-formed part is a critical part for ensuring crash performance of an automobile, and is required higher strength for enhancing collision safety and promoting weight a reduction of the body. Conventionally, this press-formed part has been produced by applying a press-forming method based on the draw-forming of a metal material sheet.

FIG. 18A is a perspective view to show an example of a curved part having a hat-shaped cross section (hereafter, simply referred to as a "curved part") 10, FIG. 18B is a top view of the curved part 10, FIG. 18C is a side view of the curved part 10, FIG. 18D is a front view of the curved part 10 seen from one end thereof, and further FIG. 18E is a perspective view to explain a convex curved portion 11a and a concave curved portion 11b of the curved part 10. Further, FIG. 19A is a cross-sectional view to schematically show a drawing machine for producing the curved part 10 by prior art, FIG. 19B is a cross-sectional view to show a stage in which a metal material sheet 201 is interposed and constrained between a die 202 and a blank holder 203, and between the die 202 and a punch 204, FIG. 19C is a cross-sectional view to show a stage in which the punch 204 is pushed inward from the stage shown in FIG. 19B, and FIG. 19D is a cross-sectional view to show a stage in which the punch 204 is further pushed inward from the stage shown in FIG. 19C to be fully pushed inward with respect to the die 202. Further, FIG. 20A is a perspective view to show the metal material sheet 201, and FIG. 20B is a perspective view to show a drawn panel 301 which is produced by prior art shown in FIGS. 19A to 19D.

For example, when producing the curved part 10 shown in FIGS. 18A to 18E, first, as shown in FIG. 19A, the metal material sheet 201 shown in FIG. 20A is placed between the blank holder 203 and the die 202, and between the punch 204 and the die 202. Next, as shown in FIG. 19B, the periphery of the metal material sheet 201 is interposed and pressurized by the die 202 and the blank holder 203. Next, as shown in FIGS. 19C and 19D, the central portion of the metal material sheet 201 is caused to bulge by the punch 204, thereby draw-forming the metal material sheet 201 into a desired shape. Since, in this process of draw-forming, the periphery of the metal material sheet 201 is held by the die 202 and the blank holder 203 as shown in FIG. 19C, the inner portion of the metal material sheet 201 is formed by the punch 204 while being subjected to tension. The metal material sheet 201 is caused to flow into the die 202 with its periphery being constrained to some degree by the die 202 and the blank holder 203, thus being formed into the drawn panel 301 having the shape shown in FIG. 20B. The curved part 10 shown in FIGS. 18A to 18E is produced by cutting off an unwanted part of the periphery of the drawn panel 301.

FIG. 21 is a perspective view to show regions of the drawn panel 301 shown in FIG. 20B, where cracks and wrinkles are likely to occur.

When producing the curved part 10 by a press-forming method based on draw-forming, as shown in FIG. 21, wrinkles attributable to a surplus of the material are likely to occur in a top plate 301a of a concave curved portion 311b and a flange 301b of a convex curved portion 311a of the drawn panel 301 at a stage in which the metal material sheet is formed into the drawn panel 301. In order to suppress the occurrence of wrinkles, it is effective in general to prevent the metal material sheet 201 from excessively flowing into the die 202 by enhancing the constraint of the periphery of the metal material sheet 201 in the forming process by means of increasing the pressurizing force of the blank holder 203 or adding a draw bead on the blank holder 203.

However, when the metal material sheet 201 is prevented from flowing into the die 202 by those means, the sheet thickness will be excessively decreased in the top sheet 301c of the convex curved portion 311a, the flange 301d of the concave curved portion 311b, and an end portion 301e in the lengthwise direction of the drawn panel 301 so that a crack will occur in these areas 301c, 301d, and 301e when the metal material sheet 201 is a material having low extensibility.

For that reason, to produce a curved part 10, which is represented by, for example, a side member, by a press-forming method based on draw-forming without causing cracks and wrinkles, it becomes difficult to use a high-strength material (for example, a high tensile strength steel sheet) having low extensibility as the metal material sheet 201 so that a low strength material having high extensibility has to be used. For this reason, the sheet thickness of the metal material sheet 201 has to be increased to ensure the strength required for the curved part 10, and thus the weight reduction of a skeleton structure member of a body shell is impaired.

Further, when producing the curved part 10 by a press-forming method based on draw-forming, since an unwanted part which exists in the outer periphery of the drawn panel 301 is to be cut off and discarded, the yield of the material will also decrease.

It is noted that Patent Literatures 1 to 4 propose a technique to bend-forming a part having a cross section, which is simple and uniform in the lengthwise direction, such as a hat-shaped cross section and a Z-shape cross section. However, Patent Literatures 1 to 4 do not disclose a method for producing a part having a complicated shape such as that of the curved part 10.

CITATION LIST

Patent Literature

Patent Literature 1: Japanese Patent Laid-Open No. 2003-103306
Patent Literature 2: Japanese Patent Laid-Open No. 2004-154859

Patent Literature 3: Japanese Patent Laid-Open No. 2006-015404

Patent Literature 4: Japanese Patent Laid-Open No. 2008-307557

SUMMARY OF INVENTION

Technical Problem

The present invention has been made in view of the above described problems of prior art, and has its object to provide: a method for producing, at a high yield, a curved part having a hat-shaped cross section and an external shape being curved in its lengthwise direction, which is suitably used for a side member (for example, a front side member and a rear side member) which is a skeleton structure member of a body shell of automobile by press-forming without causing wrinkles in a top plate of a concave curved portion and a flange of a convex curved portion, and cracks in a top plate of a convex curved portion, a flange of a concave curved portion, and further an end portion in the lengthwise direction; and a skeleton structure member such as a side member which is produced by this method.

Further, it is an object of the present invention to produce the above described skeleton structure member by using not only a low strength material having high extensibility but also a high strength material having low extensibility (for example, a high tensile strength steel sheet having a tensile strength of not less than 440 MPa) as the metal material sheet.

Solution to Problem

The present invention is described as follows:
(1) A method for producing a curved part by cold or warm press-forming a metal material sheet by using a press-forming apparatus including a die and a pad, and a punch and a blank holder which are disposed to be opposed to the die and the pad, the curved body comprising a main body having: a hat-shaped cross section which is made up of an elongated top plate, two vertical walls connecting to both side edges of the top plate and extending in a direction substantially perpendicular to the top plate, and two outwardly directed flanges which connect to the two vertical walls respectively, and an external shape in which each of the top plate, the two vertical walls and the two outwardly directed flanges is curved in an arc shape in a height direction of the vertical walls in a portion in the lengthwise direction of the top plate, wherein the curved part having the hat-shaped cross section is formed by moving the blank holder and the die relatively with respect to the pad and the punch to a side where the punch and the blank holder are disposed with the metal material sheet as a boundary while maintaining a state in which a portion to be formed into the top plate in the metal material sheet, which is disposed between the die and the blank holder, and between the pad and the punch, is pressed against the punch with the pad so as to be pressurized and interposed, and portions to be formed into the vertical walls and the outwardly directed flanges in the metal material sheet are pressed against the die with the blank holder so as to be pressurized and interposed.

In the present invention, the term "cold" means an atmosphere of a room temperature, and the term "warm" means an atmosphere of a temperature higher than "cold" and less than $Ac_3$, preferably not more than $Ac_1$.

(2) The method for producing a curved part according to item (1), wherein the pad is connected to a pad pressurizing apparatus having a fixed stroke, and the blank holder is connected to a blank holder pressurizing apparatus, and wherein after completion of the forming of the curved part, the die and the pad are separated from the blank holder and the punch to take out the curved part from the press-forming apparatus, after the blank holder is fixed so as not to relatively move with respect to the punch and is arranged so as not to press the curved part against the die, by using the pad pressurizing apparatus and the blank holder pressurizing apparatus.

(3) The method for producing a curved part according to item (1), wherein the pad is connected to a pad pressurizing apparatus, and the blank holder is connected to a blank holder pressurizing apparatus having a fixed stroke, and wherein after completion of the forming of the curved part, the die and the pad are separated from the blank holder and the punch to take out the curved part from the press-forming apparatus, after the pad is fixed so as not to relatively move with respect to the die and is arranged so as not to press the curved part against the punch, by using the pad pressurizing apparatus and the blank holder pressurizing apparatus.

(4) The method for producing a curved part according to any one of items (1) to (3), wherein the die has an internal shape including shapes of outer surfaces of each of the vertical walls and the flanges in the curved part, the pad has an exterior shape including a shape of an outer surface of the top plate in the curved part, the punch has an external shape including shapes of inner surfaces of each of the top plate and the vertical walls in the curved part, and the blank holder has an external shape including shapes of inner surfaces of the flanges in the curved part.

(5) The method for producing a curved part according to any one of items (1) to (4), wherein an interior angle formed by the top plate and the vertical wall in the cross sectional shape is 90 to 92°.

(6) The method for producing a curved part according to any one of items (1) to (5), wherein the clearance between a portion in the die which forms the vertical wall and the portion in the punch which forms the vertical wall is 100 to 120% of the sheet thickness of the metal material sheet at the time of completing the formation of the curved part.

(7) The method for producing a curved part according to any one of items (1) to (6), wherein the metal material sheet is a steel sheet having a sheet thickness of 0.8 to 3.2 mm and a tensile strength of 200 to 1600 MPa.

(8) The method for producing a curved part according to any one of items (1) to (7), wherein a portion of the metal material sheet to be formed into the top plate is pressurized by being pressed against the punch at a pressing pressure of not less than 0.1 MPa by the pad, and a portion of the metal material sheet to be formed into the vertical wall and the outwardly directed flange is pressurized by being pressed against the die at a pressing pressure of not less than 0.1 MPa by the blank holder.

(9) The method for producing a curved part according to any one of items (1) to (8), wherein the metal material sheet is a preworked metal sheet which is obtained by preworking the metal material sheet.

(10) The method for producing a curved part according to any one of items (2) to (9), wherein the curved part taken out from the press-forming apparatus is subjected to postworking.

(11) A skeleton structure member of a body shell of an automobile, comprising a main body having: a hat-shaped cross section which is made up of an elongated top plate, two vertical walls connecting to both side edges of the top plate and extending in a direction substantially perpendicular to the top plate, and two outwardly directed flanges which connect to the two vertical walls respectively; and an external shape in which each of the top plate, the two vertical walls and the two outwardly directed flanges is curved in an arc shape including a curved portion in a height direction of the vertical walls in a portion in a lengthwise direction of the top plate, wherein the main body is a cold or warm press-formed body, which uses a steel sheet having a tensile strength of not less than 440 MPa and a sheet thickness of 1.0 to 2.3 mm as a material, and the reduction rate of the sheet thickness of a curved portion with respect to that of a remaining portion excepting the curved portion is not more than 15%.

The skeleton structure member of a body shell relating to the present invention is exemplified by a front side member which constitutes an engine compartment, a rear side member which is joined to the lower surface of a rear floor panel, and further, a floor center tunnel which is joined to the front floor panel, and the like.

Advantageous Effects of Invention

According to the present invention, since the metal material sheet is formed by moving the blank holder and the die relatively with respect to the pad and the punch to the side where the punch and the blank holder are disposed with the metal material sheet as a boundary while maintaining a state in which a portion of the metal material sheet to be formed into the top plate is interposed and constrained by the pad and the punch, and portions of the metal material sheet to be formed into the vertical walls and the flanges are interposed and constrained by the blank holder and the die, it is possible to prevent the occurrence of wrinkles in the top plate and the flanges, and form the metal material sheet through the plastic deformation in which shear deformation of the vertical walls is dominant. For this reason, there is no need of applying large tension to the metal material sheet during forming, and therefore it is possible to decrease the excess material which is a part to be discarded in the metal material sheet, thereby improving the yield and solving the above described problem.

BRIEF DESCRIPTION OF DRAWINGS

FIG. 6A is an explanatory diagram to show conditions to prevent the occurrence of shear wrinkles, by showing an interior angle $\theta$ formed by the vertical wall and the top plate, and the clearance between the die and the vertical wall portion of the punch.

FIG. 6B is an explanatory diagram to show conditions to prevent the occurrence of shear wrinkles, by showing an interior angle $\theta$ formed by the vertical wall and the top plate, and a clearance at a vertical wall portion between the die and the punch.

FIG. 9C is an explanatory diagram to show a stage in which the punch has been fully retreated with respect to the die from the state of FIG. 9B.

REFERENCE SIGNS LIST

Figure 1:
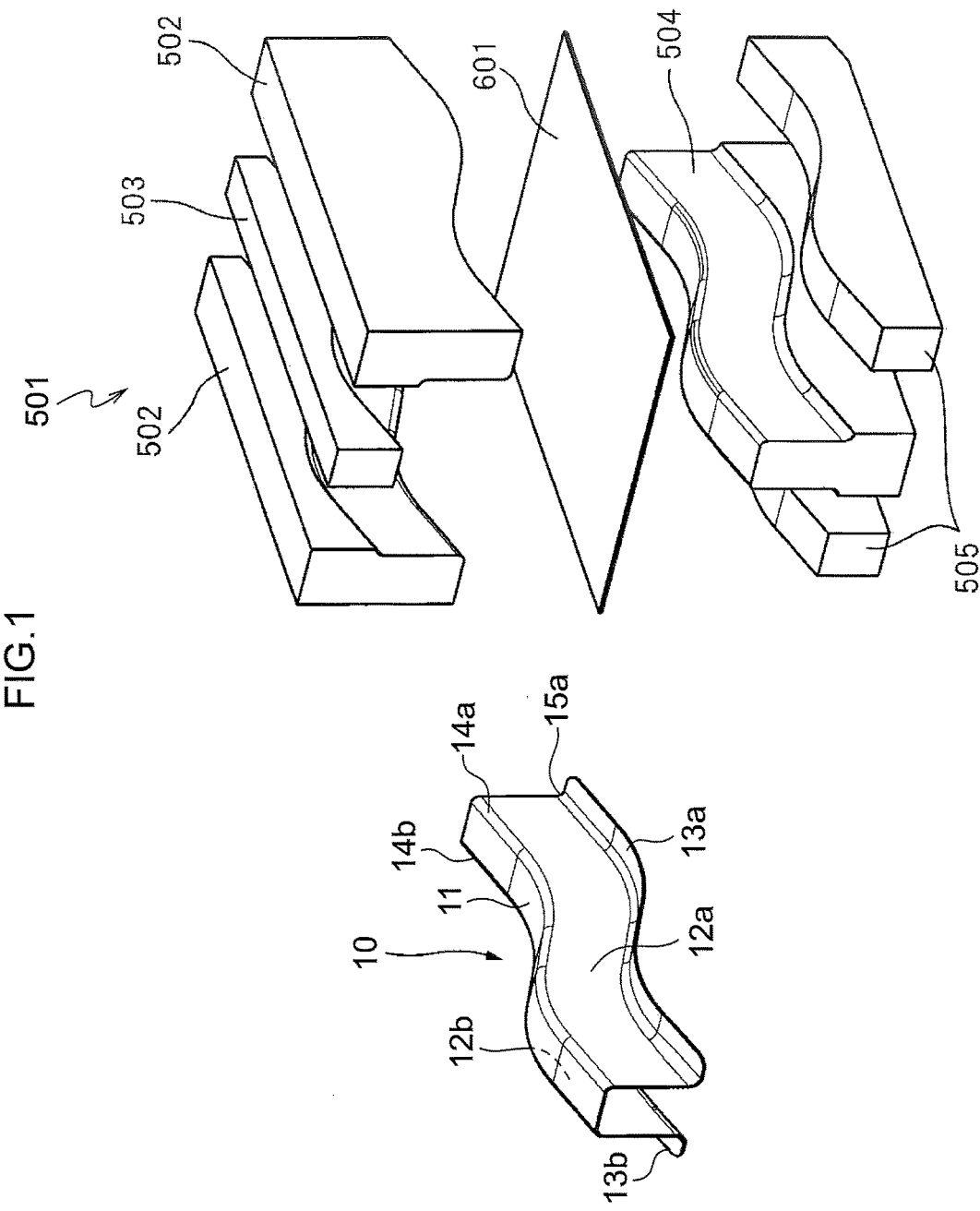
FIG. 1 is a perspective view to show in a simplified and exploded fashion a press-forming apparatus for carrying out the production method relating to the present invention to produce a curved part.

10 Curved part
11 Top plate
12a Vertical wall
12b Vertical wall
13a Flange
13b Flange
14a Ridgeline
14b Ridgeline
15a Concave line
15b Concave line
502 Die
503 Pad
504 Punch
505 Blank holder
506 Pad pressurizing apparatus
507 Blank holder pressurizing apparatus

DESCRIPTION OF EMBODIMENTS

The present invention will be described with reference to the appended drawings.

According to the present invention, a curved part 10 shown in FIGS. 18A to 18E can be produced.

As shown in FIGS. 18A to 18E, the curved part 10 has a hat-shaped cross-sectional shape which is made up of a top plate 11, vertical walls 12a and 12b which respectively connect to both side edges of the top plate 11, and outwardly directed flanges 13a and 13b which connect to the side edges of the vertical walls 12a and 12b opposite to the side edges connecting to the top plate and extend in the opposite direction to that of the top plate 11.

Ridgelines 14a and 14b are formed between the top plate 11 and the vertical walls 12a and 12b. Moreover concave lines 15a and 15b are formed between the vertical wall 12a, 12b and the outwardly directed flange 13a, 13b. The ridgelines 14a and 14b and the concave lines 15a and 15b are disposed substantially in parallel. The top plate 11 has a convex curved portion 11a which is curved in an arc shape toward the outside (the external side of the top plate 11) of the hat-shaped cross-sectional shape, and a concave curved portion 11b which is curved in an arc shape toward the inside (the internal side of the top plate 11) of the hat-shaped cross-sectional shape.

Figure 18A:
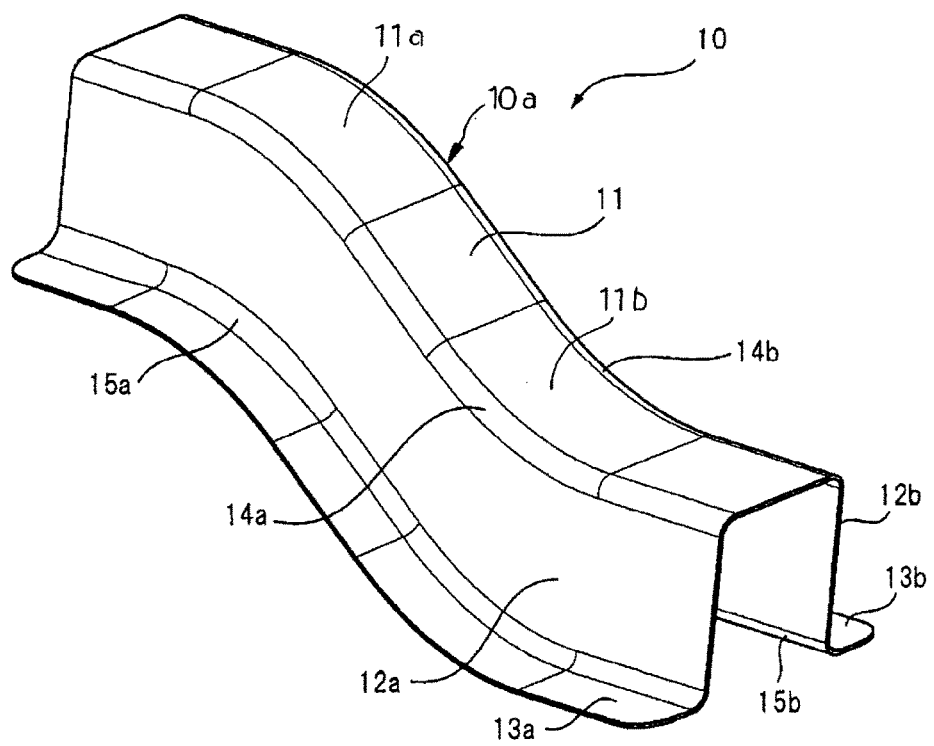
FIG. 18A is a perspective view to show an example of a curved part having a hat-shaped cross section.
Figure 18B:
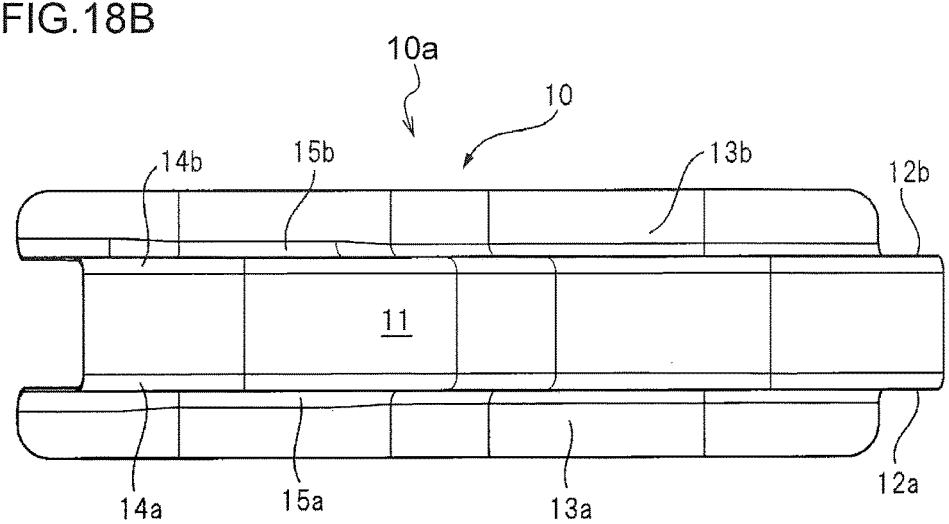
FIG. 18B is a top view of the curved part.
Figure 18C:
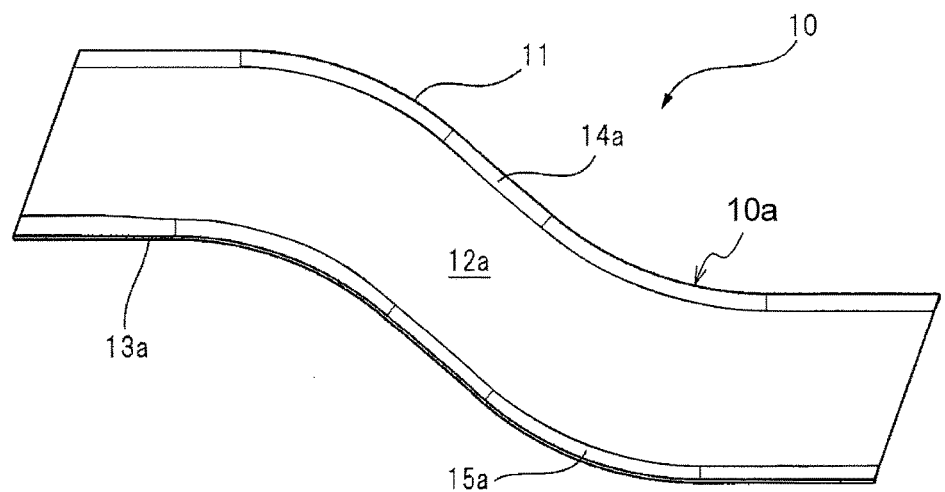
FIG. 18C is a side view of the curved part.
Figure 18D:
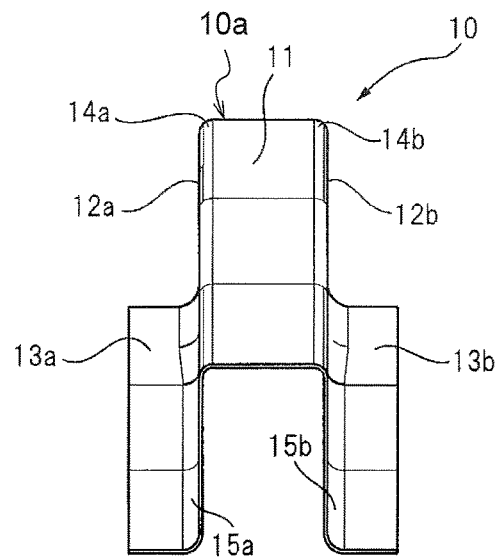
FIG. 18D is a front view of the curved part seen from one end thereof.
Figure 18E:
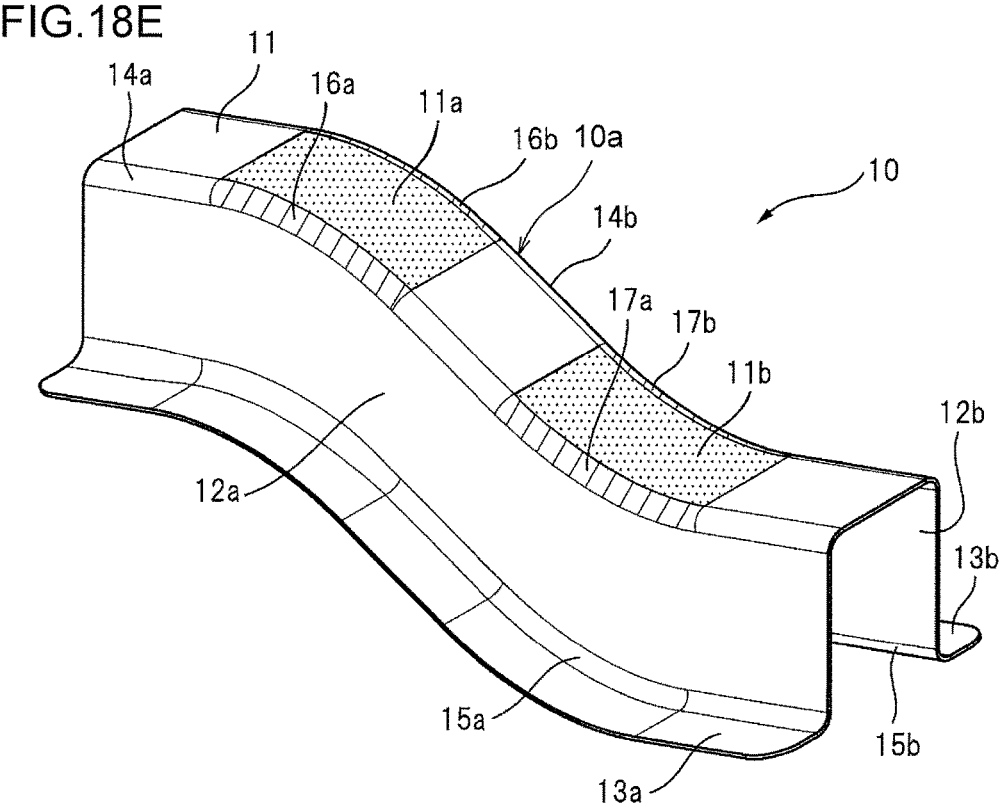
FIG. 18E is a perspective view to explain a convex curved portion and a concave curved portion of the curved part.
Figure 19A:
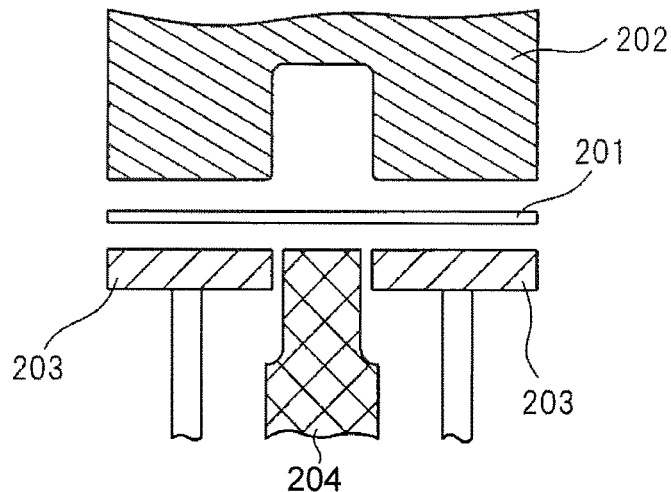
FIG. 19A is a cross-sectional view to schematically show a drawing machine for producing a curved part by prior art.
Figure 19B:
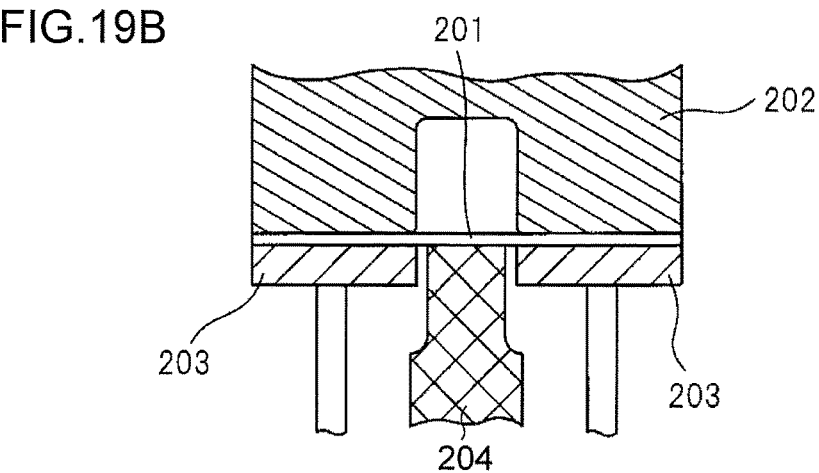
FIG. 19B is a cross-sectional view to show a stage in which a metal material sheet is interposed and constrained between a die and a blank holder and between the die and a punch.
Figure 19C:
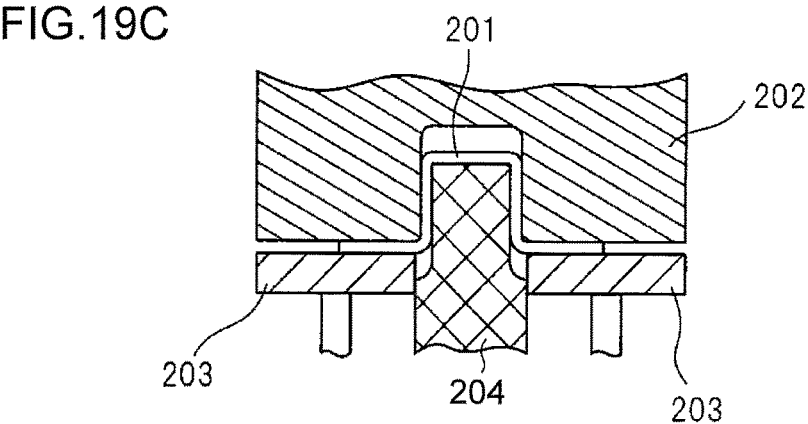
FIG. 19C is a cross-sectional view to show a stage in which the punch is further pushed inward from the stage shown in FIG. 19B.
Figure 19D:
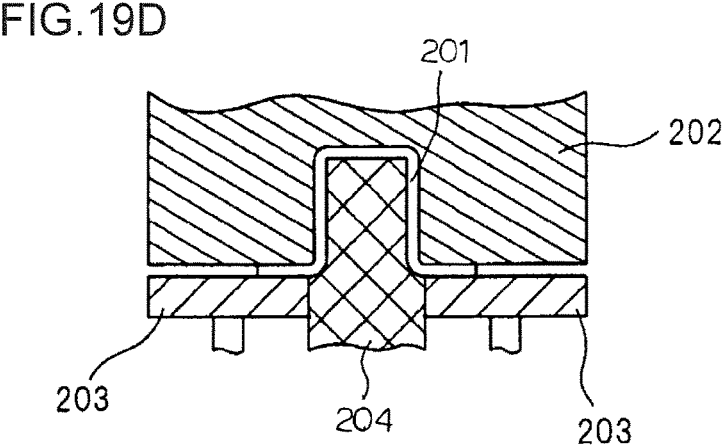
FIG. 19D is a cross-sectional view to show a stage in which the punch is further pushed inward from the stage shown in FIG. 19C to be fully pushed inward with respect to the die.
Figure 20A:
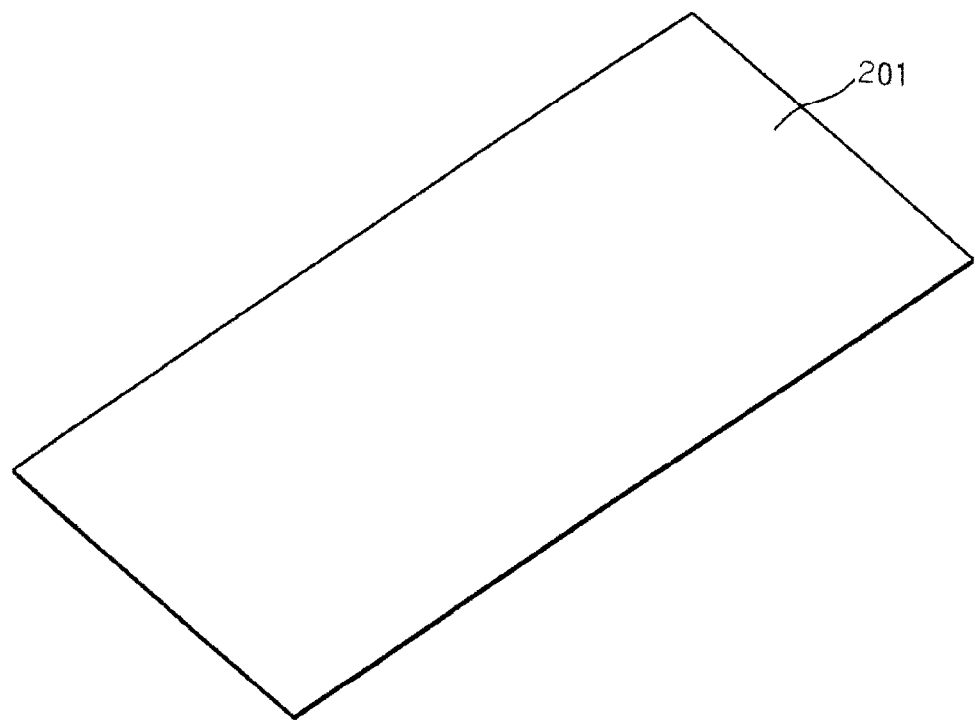
FIG. 20A is a perspective view to show a metal material sheet.
Figure 20B:
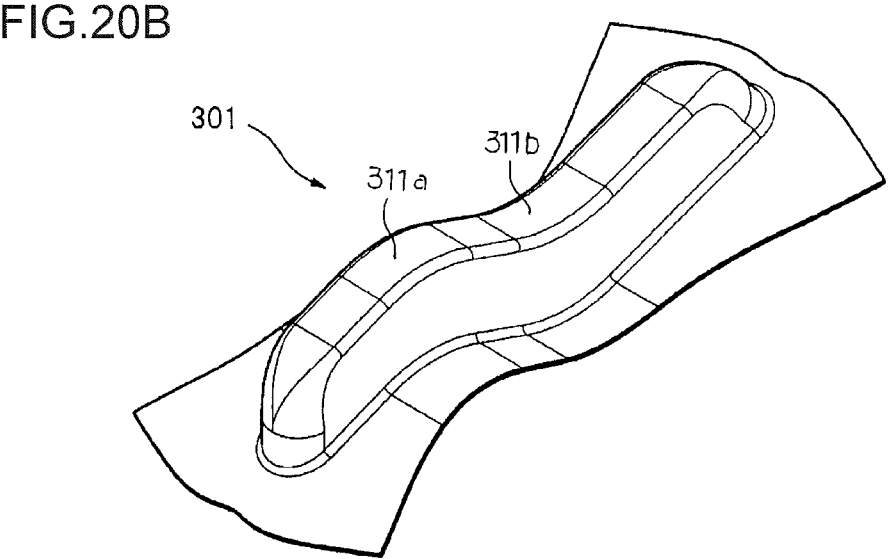
FIG. 20B is a perspective view to show a drawn panel which is produced by prior art shown in FIGS. 19A to 19D.
Figure 21:
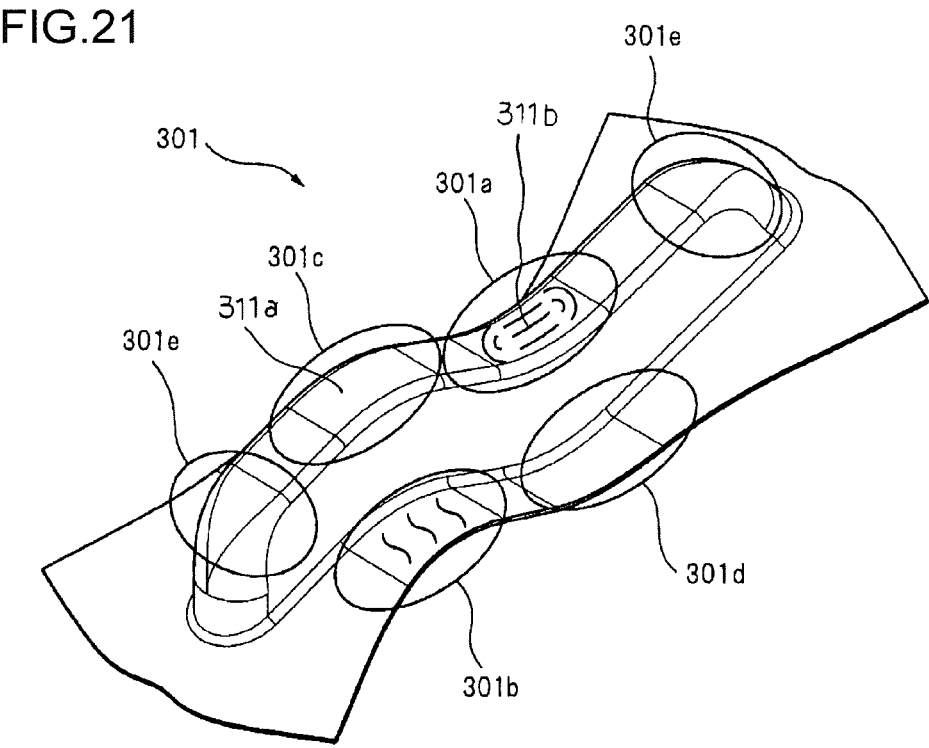
FIG. 21 is a perspective view to show regions of the drawn panel shown in FIG. 20B, where cracks and wrinkles are likely to occur.

The ridgeline 14a formed by the top plate 11 and the vertical wall 12a is curved in an arc shape in regions 16a and 17a corresponding to the convex curved portion 11a and the concave curved portion 11b, and also the ridgeline 14b formed by the top plate 11 and the vertical wall 12b is curved in an arc shape in regions 16b and 17b corresponding to the convex curved portion 11a and the concave curved portion 11b. That is, the curved part 10 takes on an S-shape in the side view as shown in FIG. 18C, and in other words, the vertical walls 12a and 12b are formed of S-shaped flat plates.

Here, the term "arc shape" is not limited to a part of a complete circular arc, and may be, for example, a part of an ellipse, hyperbola, sine curve, and other curves.

Thus, the curved part 10 has a main body 10a. The main body 10a has a hat-shaped cross sectional shape which is made up of: the elongated top plate 11, the two vertical walls 12a and 12b which connect to both side edges of the top plate 11 and extend in a direction substantially perpendicular to the top plate 11, and two outwardly directed flanges 13a and 13b which connect to the two vertical walls 12a and 12b, respectively. Further, the main body 10a has an external shape in which each of the top plate 11, the two vertical walls 12a and 12b, and the two outwardly directed flanges 13a and 13b is curved in an arc shape in a height direction of the vertical wall 12a, 12b in a portion in the lengthwise direction of the top plate 11.

FIG. 1 is a perspective view to show in a simplified and exploded fashion a press-forming apparatus 501 for carrying out the production method relating to the present invention to produce a curved part 10. As shown in FIG. 1, the press-forming apparatus 501 has a die 502, a pad 503, a punch 504, and a blank holder 505.

The die 502 has an internal shape which includes the respective external shapes of the vertical wall 12a, 12b and the flange 13a, 13b of the curved part 10. The pad 503 has an external shape including the external shape of the top plate 11 of the curved part 10. The punch 504 is disposed in opposition to the die 502 and the pad 503, and has an external shape including respective internal shapes of the top plate 11 and the vertical wall 12a, 12b of the curved part 10. Further, the blank holder 505 has an external shape which includes the internal shape of the flange 13a, 13b of the curved part 10.

Figure 2A:
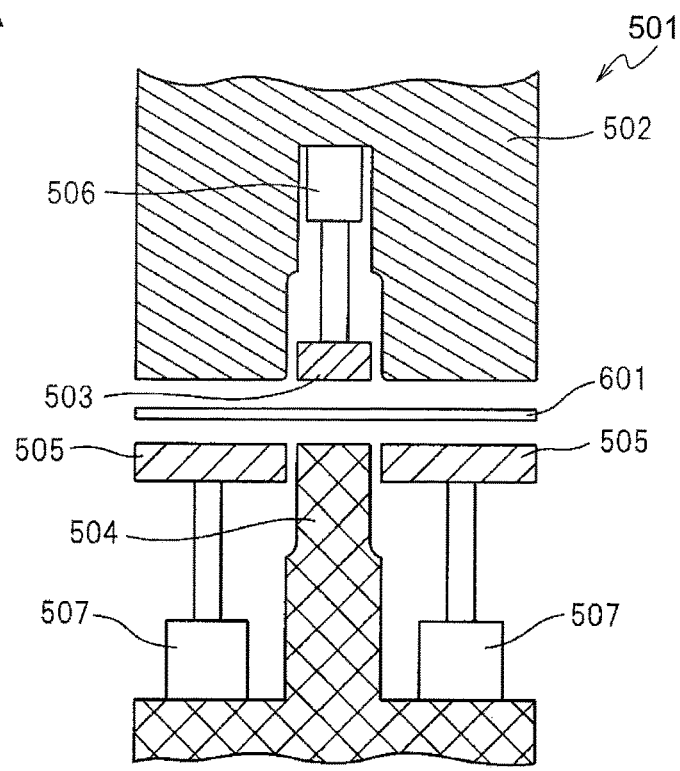
FIG. 2A is a simplified cross-sectional view to show a state at the start of processing by the press-forming apparatus shown in FIG. 1.
Figure 2B:
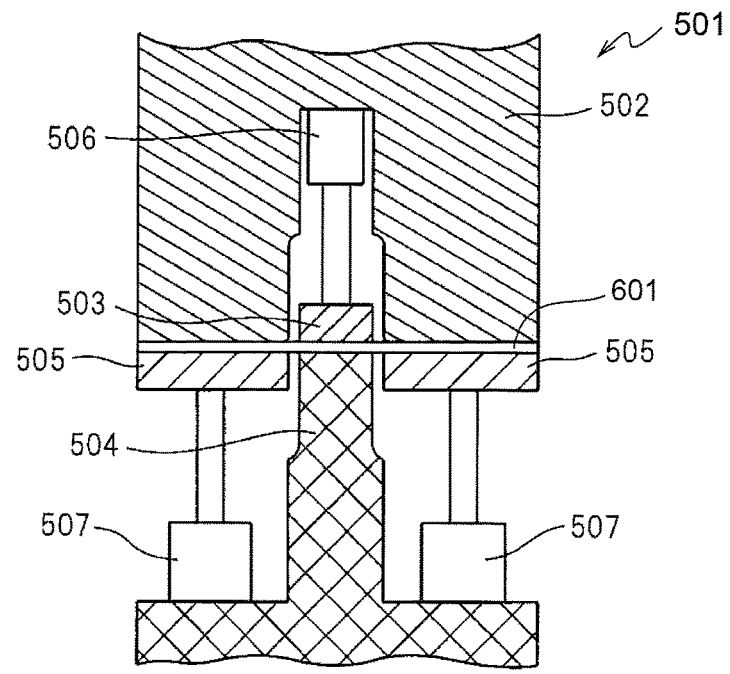
FIG. 2B is a simplified cross-sectional view to show a state in which a metal material sheet is interposed and constrained between the die and the blank holder, and between the pad and the punch in the press-forming apparatus shown in FIG. 1.
Figure 2C:
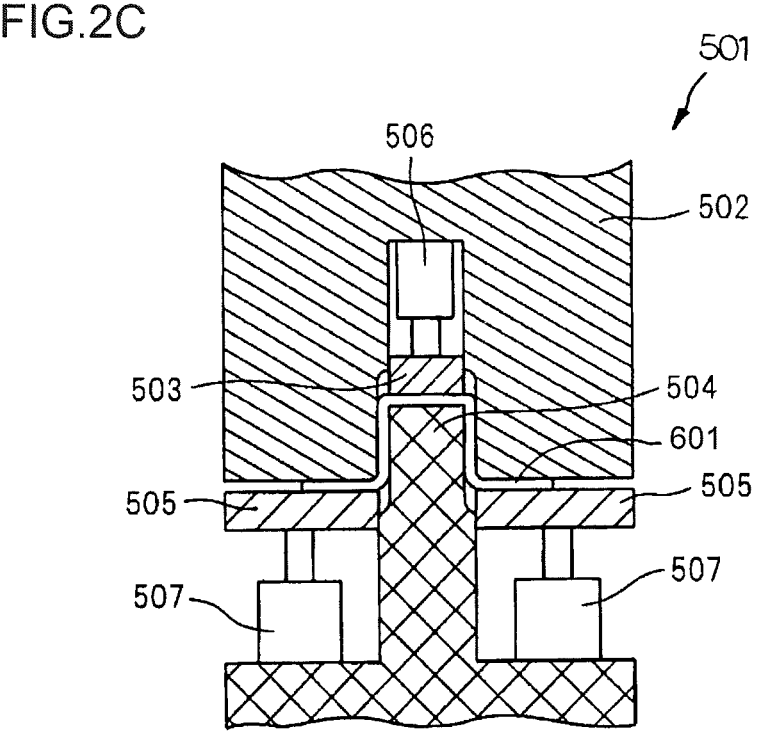
FIG. 2C is a simplified cross-sectional view to show a state in which the punch is pushed inward from the stage shown in FIG. 2B.
Figure 2D:
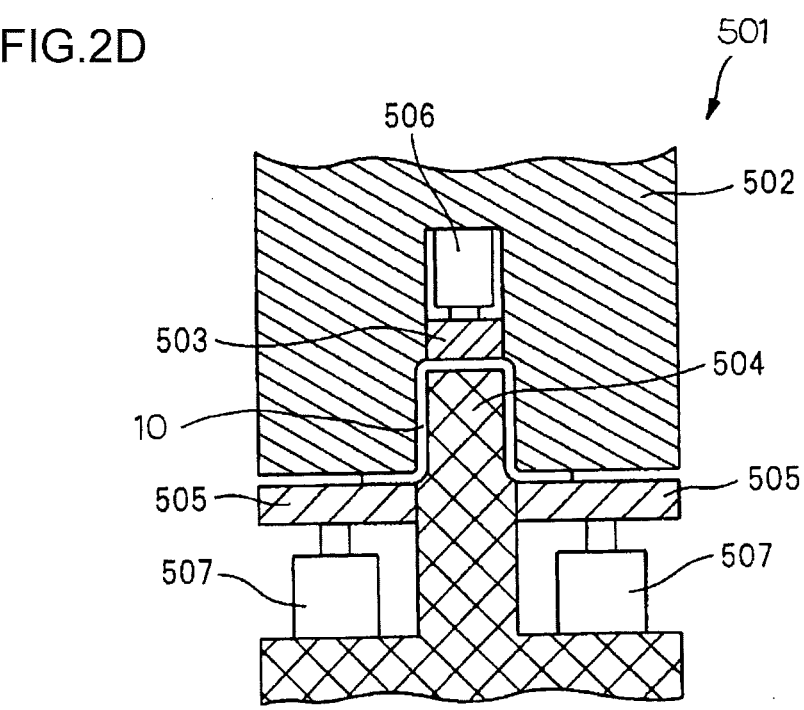
FIG. 2D is a simplified cross-sectional view to show a state in which the punch is further pushed inward from the stage shown in FIG. 2C so that the punch is fully pushed inward with respect to the die.

FIG. 2A is a simplified cross-sectional view to show a state at the start of processing by the press-forming apparatus 501. FIG. 2B is a simplified cross-sectional view to show a state in which a metal material sheet 601 is interposed and constrained between the die 502 and the holder 505, and between the pad 503 and the punch 504 in the press-forming apparatus 501. FIG. 2C is a simplified cross-sectional view to show a state in which the punch 504 is pushed inward from the stage shown in FIG. 2B. FIG. 2D is a simplified cross-sectional view to show a state in which the punch 504 is further pushed inward from the stage shown in FIG. 2C so that the punch 504 is fully pushed inward with respect to the die 502.

As shown in FIGS. 2A to 2D, the pad 503 is connected to and supported by a pad pressurizing apparatus 506 including a gas cushion, a hydraulic apparatus, a spring or an electric drive apparatus, and is able to pressurize a metal material sheet 601 to press it against the top portion of the punch 504.

Moreover, the blank holder 505 is connected to and supported by a blank holder pressurizing apparatus 507 including a gas cushion, a hydraulic apparatus, a spring or electric drive apparatus, and is able to pressurize the metal material sheet 601 to press it against the die 502.

First, as shown in FIG. 2A, the metal material sheet 601 is placed between the die 502 and the blank holder 505, and between the pad 503 and the punch 504.

Next, as shown in FIG. 2B, the portion of the metal material sheet 601 which is to be formed into the top plate 11 is pressed against the punch 504 by means of the pad 503, thereby being pressurized and interposed between the both. Moreover, the portions of the metal material sheet 601 which are to be formed respectively into the vertical walls 12a and 12b and the outwardly directed flanges 13a and 13b are pressed against the die 502 by means of the blank holder 505, thereby being pressurized and interposed between the both.

As a result of that the portion of the metal material sheet 601 which is to be formed into the top plate 11 is pressed against the punch 504 by means of the pad 503 which is pressurized by the pad pressurizing apparatus 506, and is thereby pressurized and interposed between the both, the metal material sheet 601 is held in a state in which out-of-plane deformation is inhibited. Moreover, as a result of that the portions of the metal material sheet 601 which are to be formed respectively into the vertical walls and the outwardly directed flanges are pressed against the die 502 by means of the blank holder 505 which is pressurized by the blank holder pressurizing apparatus 507, and is pressurized and interposed between the both, the metal material sheet 601 is held in a state in which out-of-plane deformation is inhibited.

By moving the blank holder 505 and the die 502 in this state to a side, where the punch 504 and the blank holder 505 are disposed with the metal material sheet 601a s a boundary, relatively with respect to the pad 503 and the punch 504, the metal material sheet 601 is formed.

As shown in FIG. 2C, as the punch 504 and the blank holder 505 move, the metal material sheet 601 interposed between the punch 504 and the blank holder 505 flows to inside the die 502, and thereby the vertical walls 12a and 12b are formed.

Then, as shown in FIG. 2D, the forming is completed at a stage in which the punch 504 and the blank holder 505 have moved a predetermined distance to ensure the necessary height of the vertical walls 12a and 12b.

Here, in the example shown in FIGS. 2A to 2D, the die 502 is pushed inward in a state in which the punch 504 is fixed, and the pad 503 presses the metal material sheet 601 to the punch 504 thereby being immobile during the process of forming. However, the present invention will not be limited to this embodiment.

Figure 3:
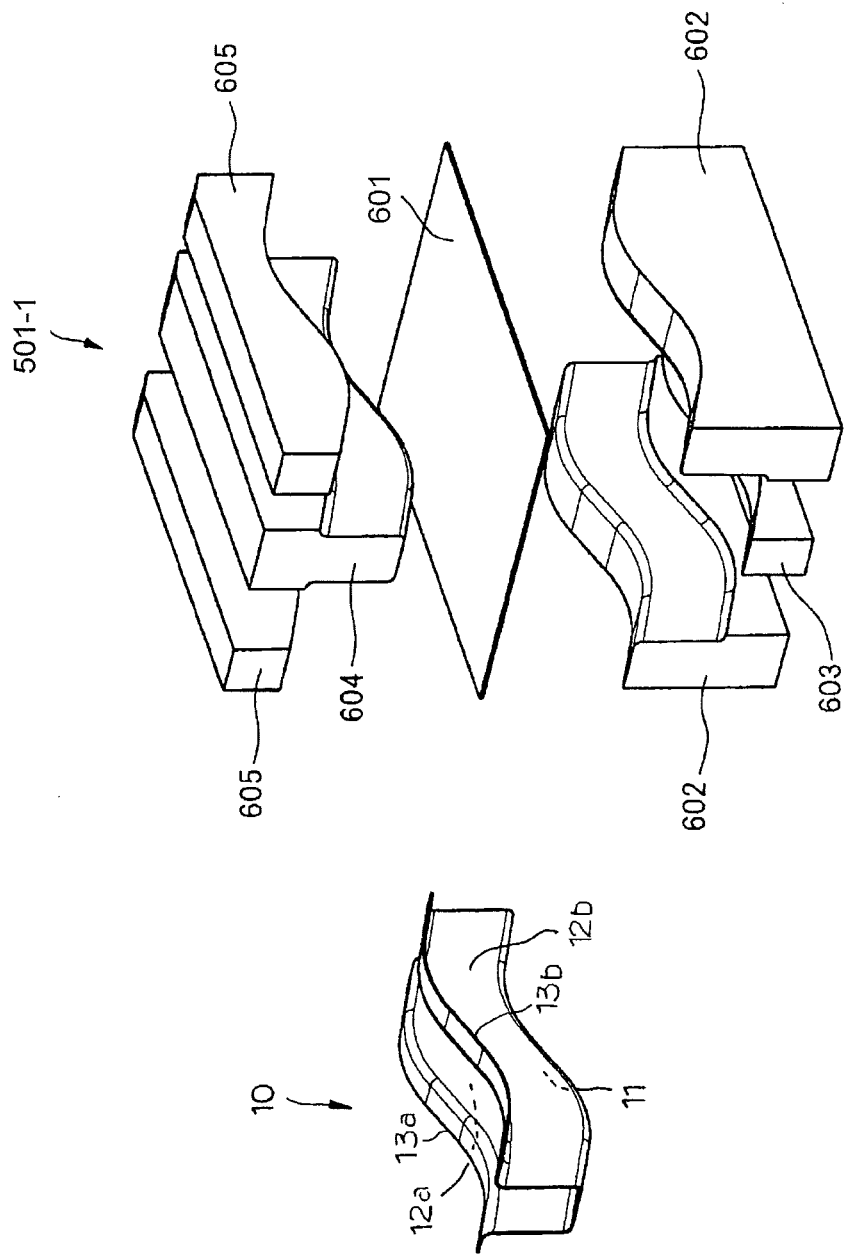
FIG. 3 is a perspective view to show in a simplified and exploded fashion another press-forming apparatus for carrying out the production method relating to the present invention to produce a curved part.
Figure 4A:
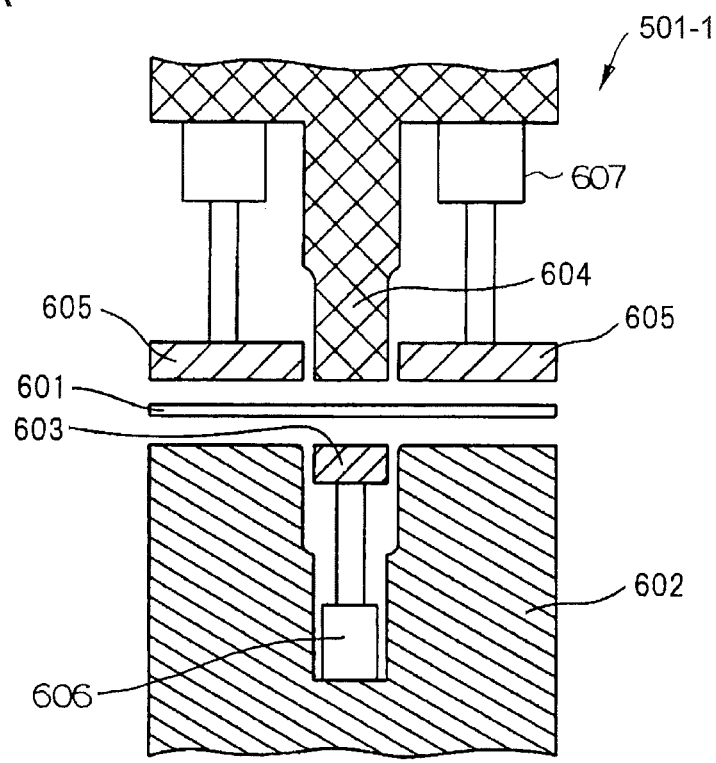
FIG. 4A is a simplified cross-sectional view to show a state at the start of processing by the press-forming apparatus shown in FIG. 3.
Figure 4B:
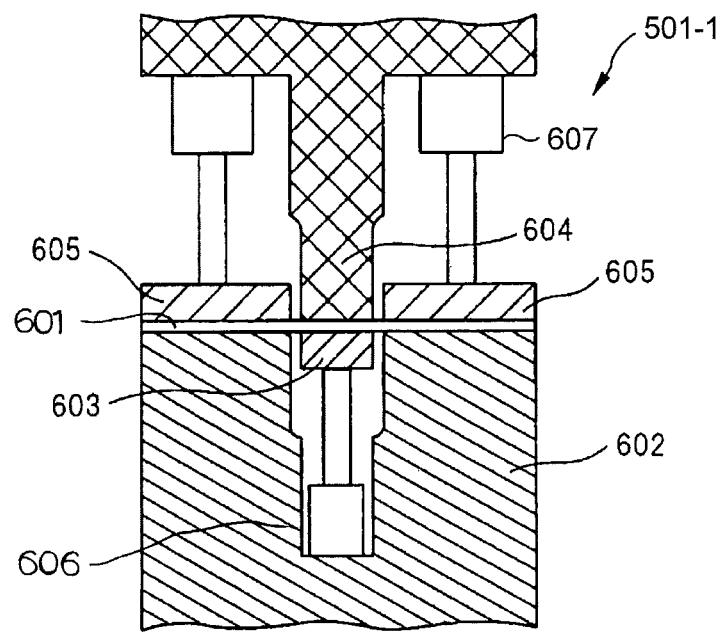
FIG. 4B is a simplified cross-sectional view to show a state in which the metal material sheet is interposed and constrained between the die and the blank holder, and between the pad and the punch of the press-forming apparatus shown in FIG. 3.
Figure 4C:
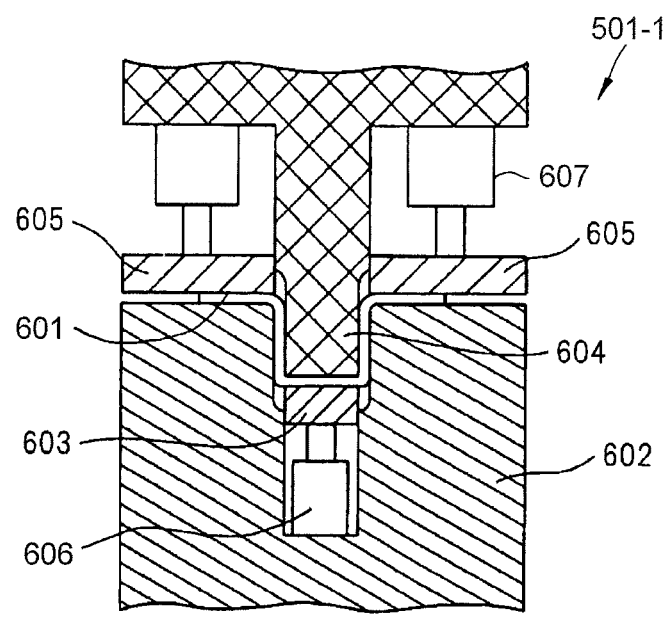
FIG. 4C is a simplified cross-sectional view to show a state in which the punch is pushed inward from the stage shown in FIG. 4B.
Figure 4D:
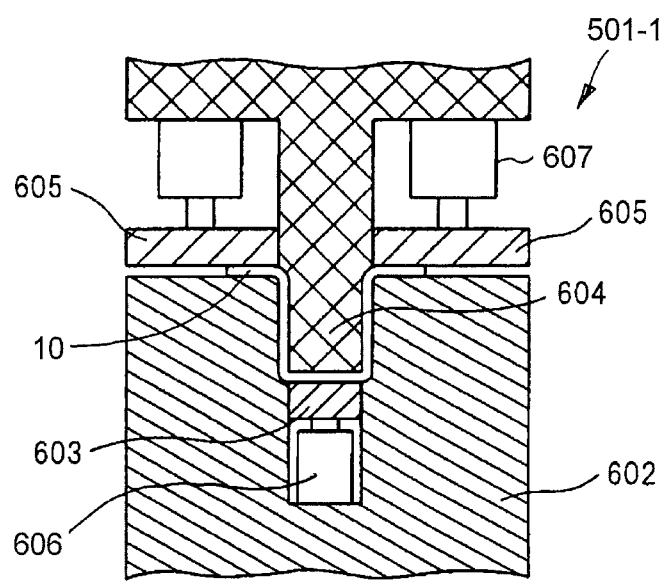
FIG. 4D is a simplified cross-sectional view to show a state in which the punch is further pushed inward from the stage shown in FIG. 4C and thereby the punch is fully pushed inward with respect to the die.

FIG. 3 is a perspective view to show in a simplified and exploded fashion another press-forming apparatus 501-1 for carrying out the production method relating to the present invention to produce a curved part 10. Moreover, FIG. 4A is a simplified cross-sectional view to show a state at the start of processing by the press-forming apparatus 501-1 shown in FIG. 3; FIG. 4B is a simplified cross-sectional view to show a state in which the metal material sheet 601 is interposed and constrained between a die 602 and a holder 605, and between a pad 603 and a punch 604 of the press-forming apparatus 501-1 shown in FIG. 3; FIG. 4C is a simplified cross-sectional view to show a state in which the punch 604 is pushed inward from the stage shown in FIG. 4B; and FIG. 4D is a simplified cross-sectional view to show a state in which the punch 604 is further pushed inward from the stage shown in FIG. 4C and thereby the punch 604 is fully pushed inward with respect to the die 602.

In contrast to the example shown in FIG. 1 and FIGS. 2A to 2D, it is also possible to move the blank holder 605 and the die 602 relatively with respect to the pad 603 and the punch 604 to the side where the punch 604 and the blank holder 605 are disposed with the metal material sheet 601 as a boundary by pushing the punch 604 inward thereby moving the pad 603 together with the punch 604 in a state in which the die 602 is fixed, and the blank holder 605 presses the metal material sheet 601 to the die 602 thereby being immobile as shown in FIG. 3 and FIGS. 4A to 4D. That is, the example shown in FIG. 3 and FIGS. 4A to 4D is the same as one shown in FIG. 1 and FIGS. 2A to 2D with regard to the relative movement of the metal mold, and can form the metal material sheet 601 into the curved part 10 in the same manner.

Since the portion of the metal material sheet 601 which is to be formed into the top plate 11 is pressurized and interposed by the pad 503 and the punch 504 while the vertical walls 12a and 12b are formed, out-of-plane deformation will not occur in the metal material sheet 601 if the pressurizing force is sufficient, and it is possible to completely prevent the occurrence of wrinkles. Moreover, the portions of the metal material sheet 601 which are to be formed into the flanges 13a and 13b are also pressurized and interposed by the blank holder 505 and the die 502, out-of-plane deformation will not occur in the metal material sheet 601 if the pressurizing force is sufficient, and it is possible to completely prevent the occurrence of wrinkles.

When the above mentioned pressurizing force is insufficient, the out-of-plane deformation of the metal material sheet 601 cannot be prevented, and wrinkles will occur. When the metal material sheet 601 is a steel sheet having a sheet thickness: not less than 0.8 mm and not more than 3.2 mm, and a tensile strength: not less than 200 MPa and not more than 1600 MPa, which is commonly used as a skeleton structure member of a body shell of automobile, such as a side member (a front side member and a rear side member) etc., the above mentioned pressurizing force is desirably not less than 0.1 MPa.

Figure 5A:
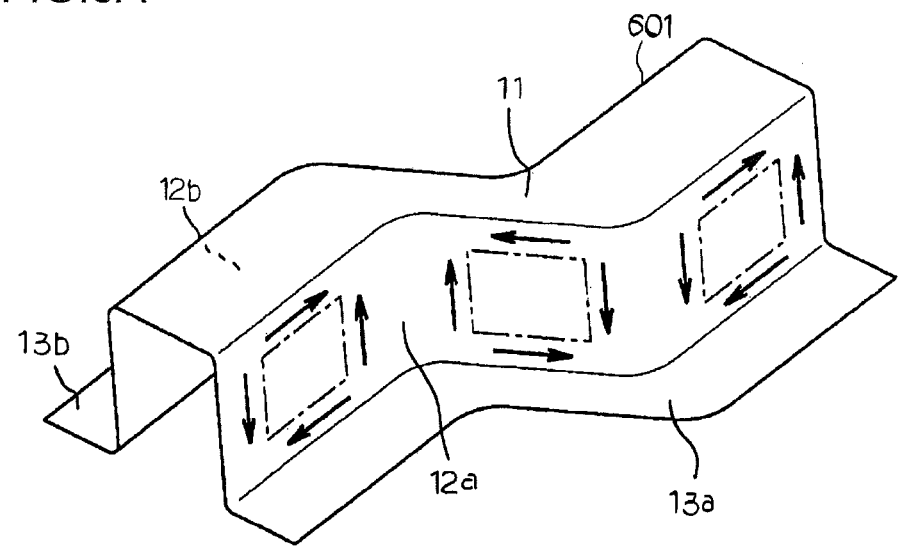
FIG. 5A is an explanatory diagram to show the principle of the present invention.
Figure 5B:
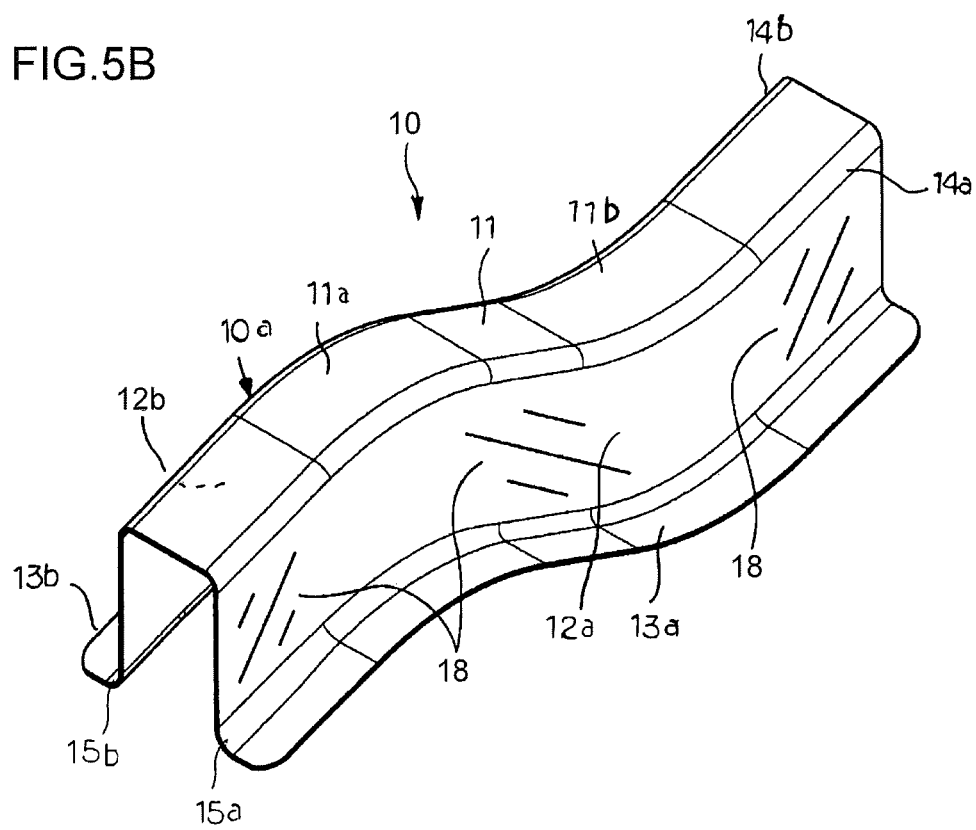
FIG. 5B is an explanatory diagram to show shear wrinkles which may occur when carrying out the present invention.
Figure 5C:
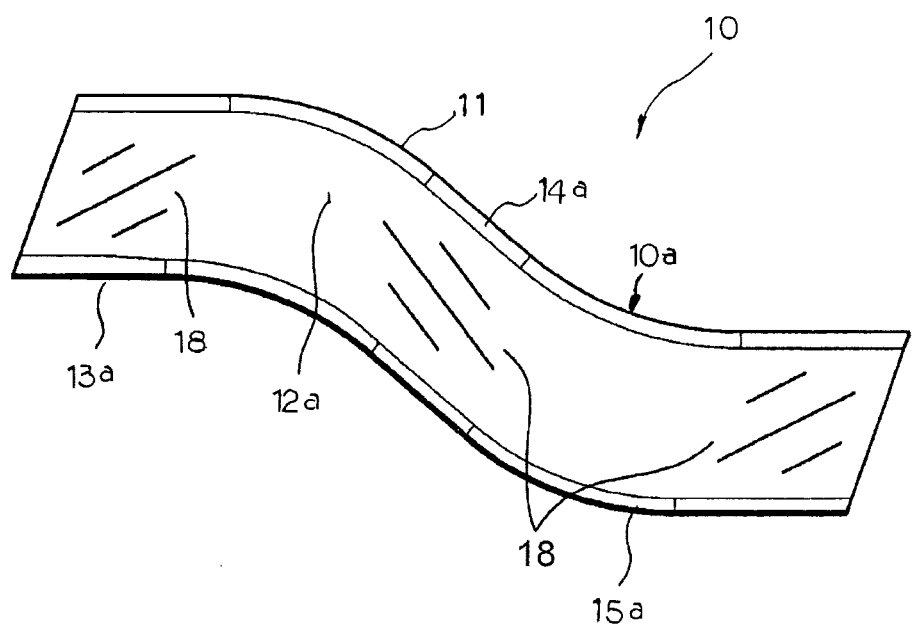
FIG. 5C is a side view to show shear wrinkles which may occur when carrying out the present invention.

FIG. 5A is an explanatory diagram to show the principle of the present invention, FIG. 5B is a perspective view to show shear wrinkles which may occur when carrying out the present invention, and FIG. 5C is a side view to show shear wrinkles which may occur when carrying out the present invention.

In the present invention, portions of the metal material sheet 601 which are to be formed into the vertical walls 12a and 12b are pressurized and interposed by the blank holder 505 and the die 502, a portion which is to be formed into the top plate 11 is pressurized and interposed by the pad 503 and the punch 504. Moreover, portions which are to be formed into the flanges 13a and 13b are also pressurized and interposed by the blank holder 505 and the die 502. Further, any of the portion to be formed into the top plate 11, the portions to be formed into the vertical walls 12a and 12b, and the portions to be formed into the outwardly directed flanges 13a and 13b is formed so as to be curved in an arc shape in a height direction of the vertical wall 12a, 12b. As a result of this, the portions to be formed into the vertical walls 12a and 12b are subjected to shear deformation as shown in FIG. 5A. Therefore, according to the present invention, the metal material sheet 601 can be formed into the curved part 10 through the plastic deformation in which shear deformation of the portions to be formed into the vertical walls 12a and 12b is dominant. Since shear deformation is deformation which exhibits very small amount of area change, and therefore very small thickness change between before and after the deformation, decrease in the sheet thickness of the vertical walls 12a and 12b of the curved part 10 is suppressed.

Further, although the portions to be formed into the top plate 11 and the outwardly directed flanges 13a and 13b are bent out of plane, since they are not subjected to large tensile deformation and compressive deformation, decrease in the sheet thickness is also suppressed for the portions of the top plate 11 and the outwardly directed flanges 13a and 13b, resulting in suppression of decrease in the sheet thickness as the entire curved part 10.

Moreover, since the portions of the metal material sheet 601 to be formed into the vertical walls 12a and 12b are subjected to shear deformation, they will undergo compressive deformation in a minimum principal strain direction of shear deformation while the vertical walls 12a and 12b are formed. Therefore, if the clearance of the vertical wall portions of the die 502 and the punch 504 is excessive, shear wrinkles 18 occur as shown in FIGS. 5B and 5C. To suppress the occurrence of such shear wrinkles 18, it is effective to set the clearance between the die 502 and the punch 504, which is the clearance at the portions for forming the vertical walls 12a and 12b, to be small and close to the thickness of the metal material sheet 601, while the vertical walls 12a and 12b are formed.

FIG. 6A is an explanatory diagram to show conditions to prevent the occurrence of shear wrinkles 18, by showing an interior angle θ formed by the vertical wall 12a, 12b and the top plate 11, and a clearance b at a portion where the vertical wall 12a, 12b is formed, which is a clearance between the die 502 and the punch 504. FIG. 6B is an explanatory diagram to show conditions to prevent the occurrence of shear wrinkles, by showing an interior angle θ formed by the vertical wall 12a, 12b and the top plate 11, and a clearance b at a portion where the vertical wall 12a, 12b is formed, which is a clearance between the die 502 and the punch 504.

As shown in FIGS. 6A and 6B, the interior angle θ formed by the vertical wall 12a, 12b and the top plate 11 needs to be not less than 90° such that the interior angle θ does not form a negative angle of the metal mold at the time of forming. However, if the interior angle θ is excessively larger than 90°, the clearance at an early stage of forming becomes large. For this reason, it is advantageous that the interior angle θ is not less than 90° and not more than an angle which is as close as possible to 90°. For example, taking a case as an example in which a steel sheet having a sheet thickness: not less than 0.8 mm and not more than 3.2 mm, and a tensile strength: not less than 200 MPa and not more than 1600 MPa, which is commonly used as a skeleton structure member of a body shell of automobile, such as a side member (a front side member and a rear side member) etc. is used as the metal material sheet 601 to form a curved part 10 of which the height of the vertical wall 12a, 12b is not more than 200 mm, when the interior angle θ is more than 92°, wrinkles may occur on the vertical walls 12a and 12b as shown in FIG. 6B, and therefore it is desirable that the interior angle θ formed by the top plate 11 and the vertical wall 12a, 12b is not less than 90° and not more than 92°, and that a clearance b at the portion for forming the vertical wall 12a, 12b, which is a clearance between the die 502 and the punch 504 at the time when the forming of vertical wall 12a, 12b is completed, is not less than 100% and not more than 120% of the sheet thickness of the metal material sheet 601.

Figure 7A:
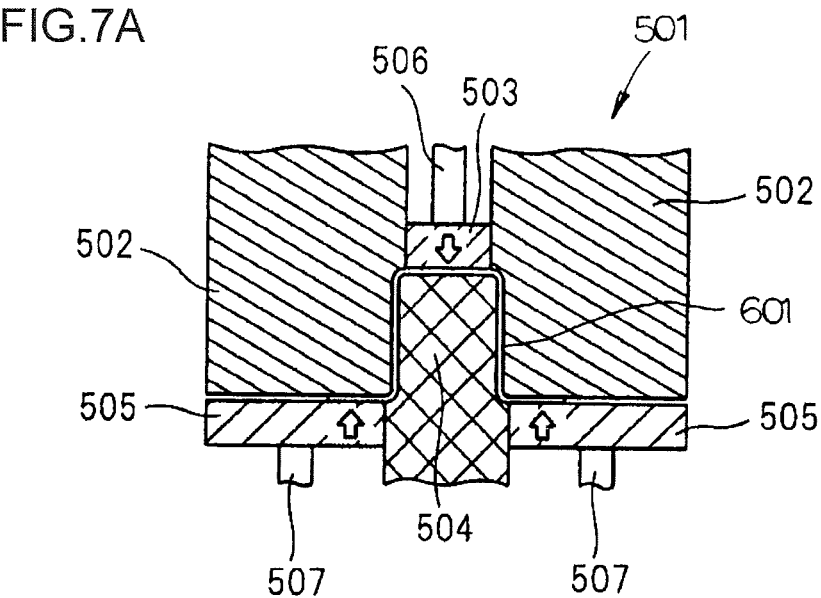
FIG. 7A is an explanatory diagram to show defects which may occur when the curved part is taken out from the metal mold after the punch is fully pushed inward the die thereby forming the metal material sheet into the curved part.
Figure 7B:
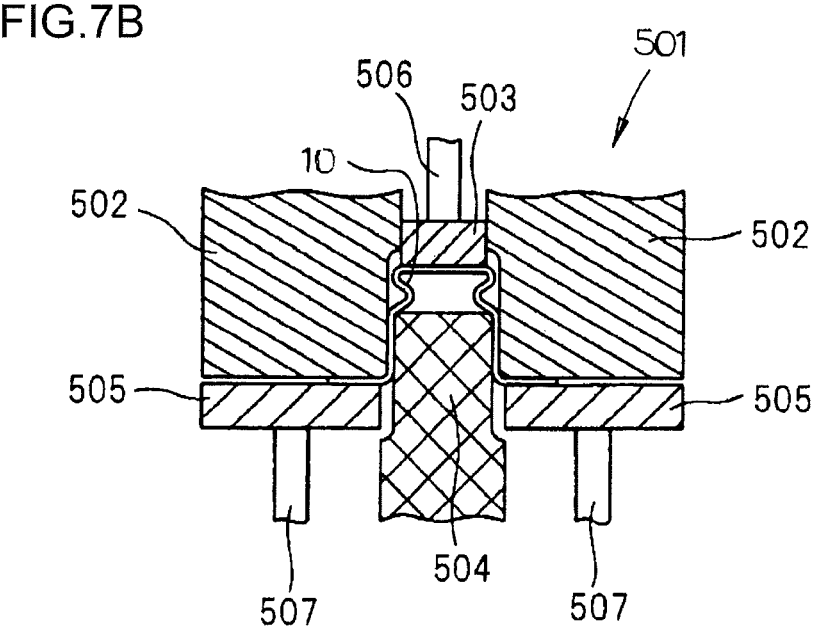
FIG. 7B is an explanatory diagram to show a stage in which the punch is retreated with respect to the die from the state shown in FIG. 7A.

FIG. 7A is an explanatory diagram to show defects which may occur when the curved part 10 is taken out from the metal mold after the punch 504 is fully pushed inward the die 502, thereby forming the metal material sheet 601 into the curved part 10; FIG. 7B is an explanatory diagram to show a stage in which the punch 504 is retreated with respect to the die 502 from the state shown in FIG. 7A; and further FIG. 7C is an explanatory diagram to show a stage in which the punch 504 has been fully retreated with respect to the die 502 from the state shown in FIG. 7B.

Figure 7C:
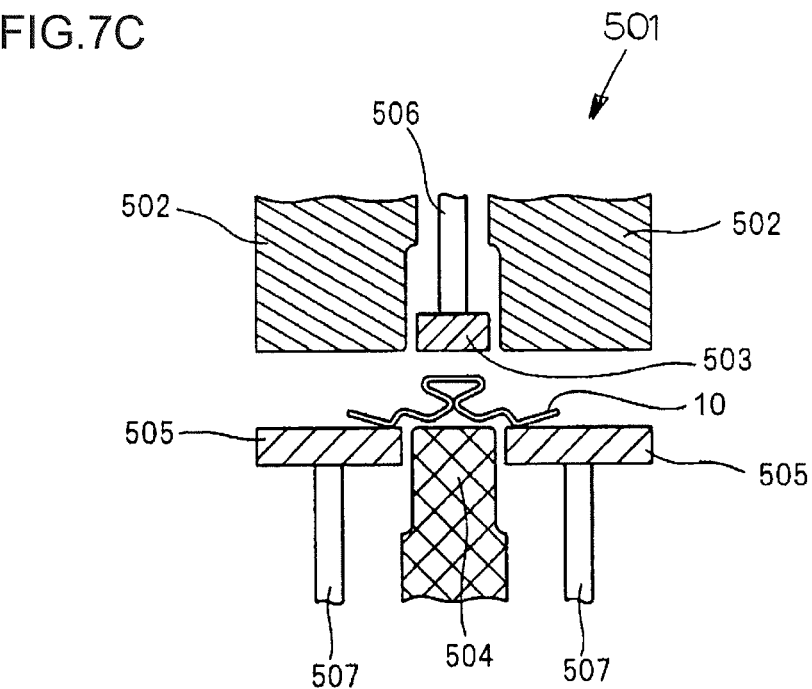
FIG. 7C is an explanatory diagram to show a stage in which the punch has been fully retreated with respect to the die from the state shown in FIG. 7B.

As shown in FIG. 7A to 7C, if the die 502 is separated from the punch 504 to make a gap between the metal molds to take out the curved part 10 from the metal molds after forming the metal material sheet 601 into the curved part 10, since the pad 503 and the blank holder 505 are respectively pressurized by the pad pressurizing apparatus 506 and the blank holder pressurizing apparatus 507, the curved part 10 is subjected to pressurizing forces in opposite directions from the pad 503 and the blank holder 505 respectively, and is thereby deformed and crushed so that a curved part 10 of a predetermined shape will not be achieved.

Figure 8A:
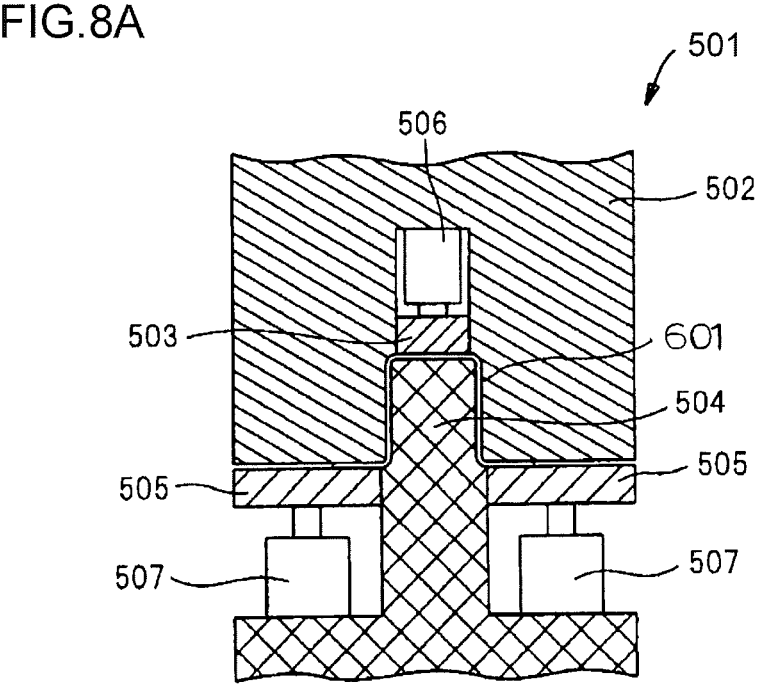
FIG. 8A is an explanatory diagram to show a method for solving defects shown by FIGS. 7A to 7C.
Figure 8B:
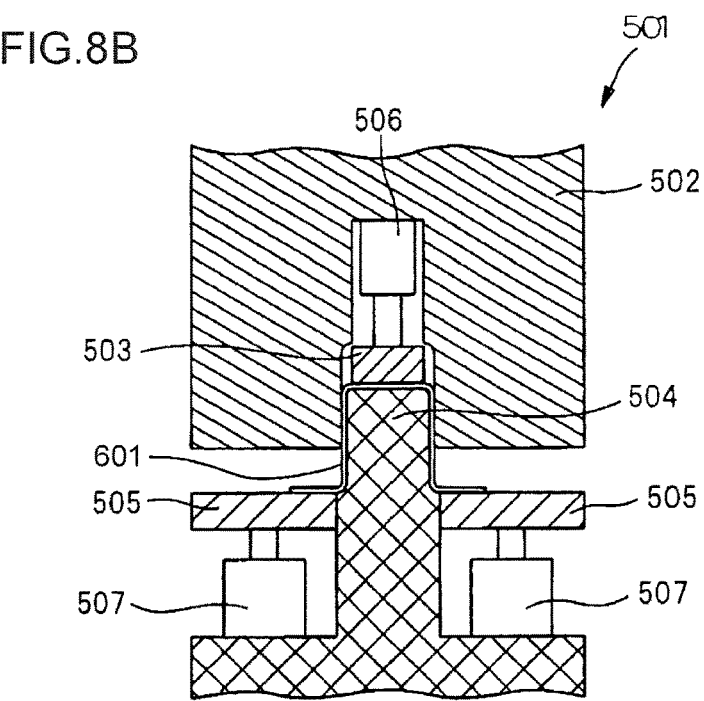
FIG. 8B is an explanatory diagram to show a stage in which the punch is retreated with respect to the die from the state shown in FIG. 8A.

FIG. 8A is an explanatory diagram to show a method for solving defects shown by FIGS. 7A to 7C; FIG. 8B is an explanatory diagram to show a stage in which the punch 504 is retreated with respect to the die 502 from the state shown in FIG. 8A; and further FIG. 8C is an explanatory diagram to show a stage in which the punch 504 has been fully retreated with respect to the die 502 from the state shown in FIG. 8B.

Figure 8C:
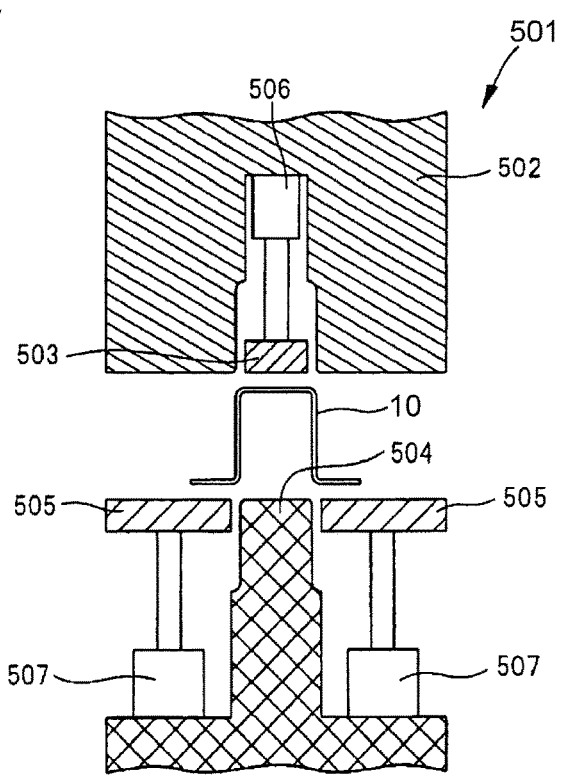
FIG. 8C is an explanatory diagram to show a stage in which the punch has been fully retreated with respect to the die from the state shown in FIG. 8B.

If after the metal material sheet 601 is formed into the curved part 10, the die 502 and the pad pressurizing apparatus 506 are separated from the blank holder 505 in a state in which the blank holder 505 is fixed so as not to move relative to the punch 504 and the blank holder 505 does not press the curved part 10 which has been formed against the die 502, as shown in FIGS. 8A to 8C, although the pad 503 pressurizes the curved part 10 until the pad pressurizing apparatus 506 extends to an stroke end, when the pad pressurizing apparatus 506 moves not less than a fixed distance and the pad pressurizing apparatus 506 extends out to the stroke end, the pad 503 thereafter departs from the punch 504, so that the die 502 and the pad 503 can be departed from the blank holder 505 and the punch 504 without the curved part 10 being subjected to pressurization from the pad 503 and the blank holder 505 at the same time, and thereby the curved part 10 can be taken out from the metal molds.

Figure 9A:
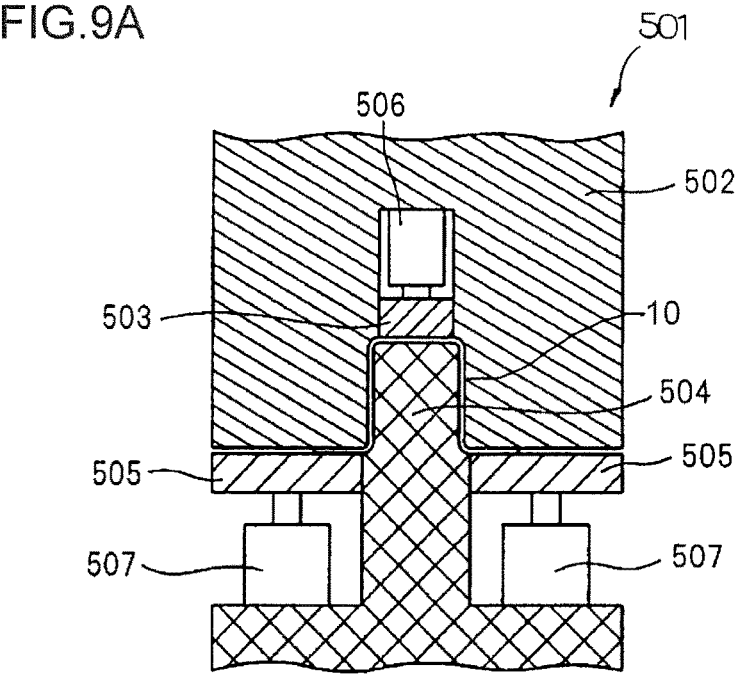
FIG. 9A is an explanatory diagram to show another method for solving the defects shown by FIGS. 7A to 7C.
Figure 9B:
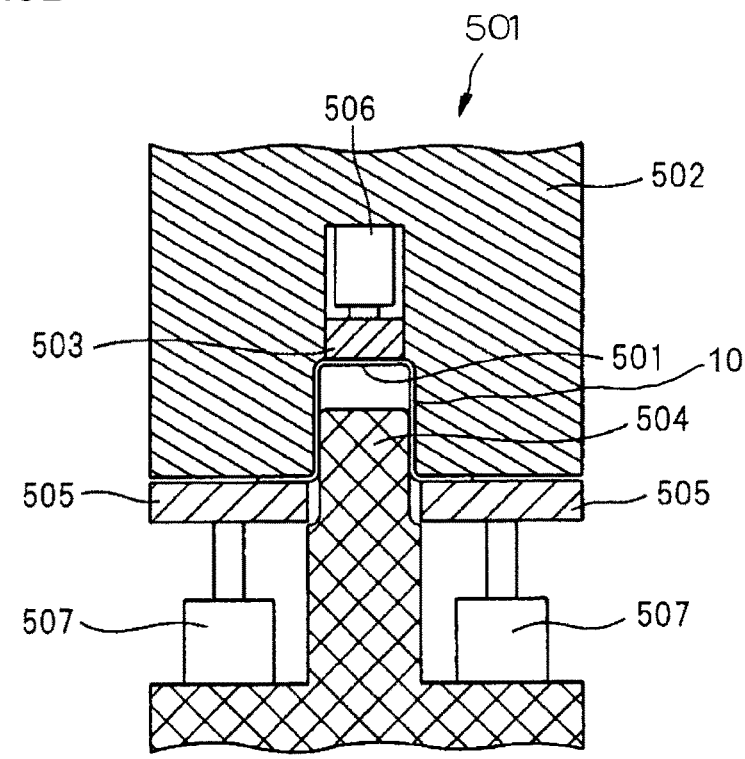
FIG. 9B is an explanatory diagram to show a stage in which the punch is retreated with respect to the die from the state shown in FIG. 9A.

FIG. 9A is an explanatory diagram to show another method for solving the defects shown by FIGS. 7A to 7C; FIG. 9B is an explanatory diagram to show a stage in which the punch is retreated with respect to the die from the state shown in FIG. 9A; and further FIG. 9C is an explanatory diagram to show a stage in which the punch has been fully retreated with respect to the die from the state of FIG. 9B.

If, after the metal material sheet 601 is formed into the curved part 10, the pad 503 and the die 502 are separated from the blank holder 505 and the punch 504 in a state in which the pad 503 is fixed so as not to relatively move with respect to the die 502, and is arranged so as not to press the curved part 10 against the punch 504, as shown in FIGS. 9A to 9C, the blank holder 505 will pressurize the curved part 10 until the blank holder pressurizing apparatus 507 extends to the stroke end; however when the die 502 moves not less than a predetermined distance, and the blank holder pressurizing apparatus 507 extends out to the stroke end, thereafter the blank holder 505 departs from the die 502, and the curved part 10 not being subjected to pressurization from the pad 503 and the blank holder 505 at the same time so that the die 502 and the pad 503 can be separated from the blank holder 505 and the punch 504, and thereby the curved part 10 can be taken out from the metal molds.

Figure 10A:
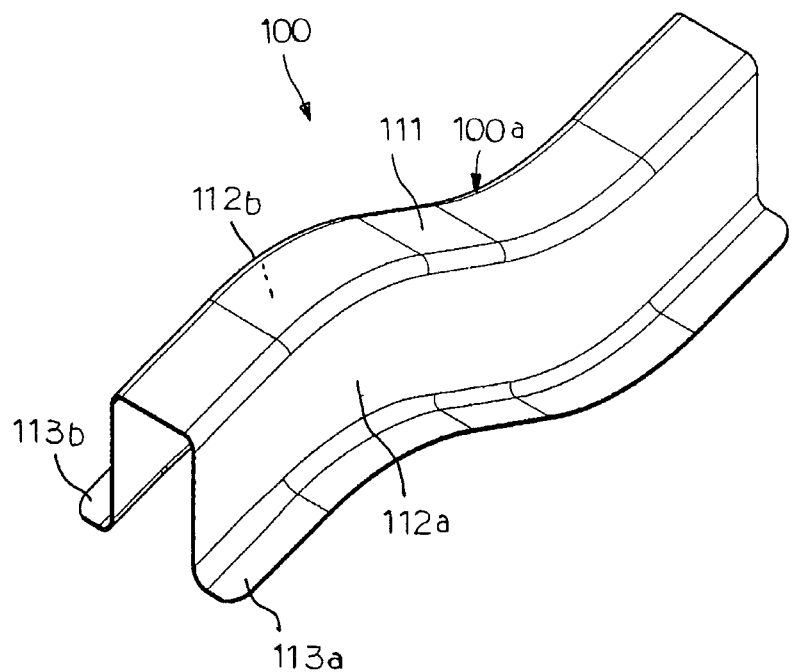
FIG. 10A is a perspective view to show an example of a curved part having a hat-shaped cross section which is produced by applying the present invention.
Figure 10B:
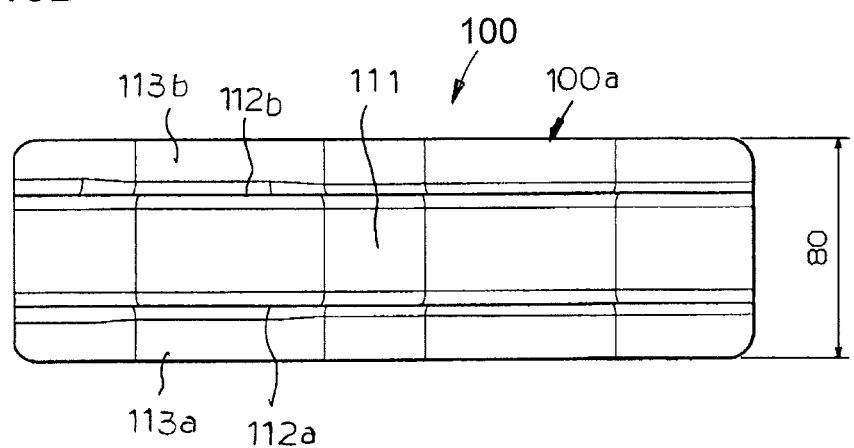
FIG. 10B is a plan view seen from the above of the curved part shown in FIG. 10A.
Figure 10C:
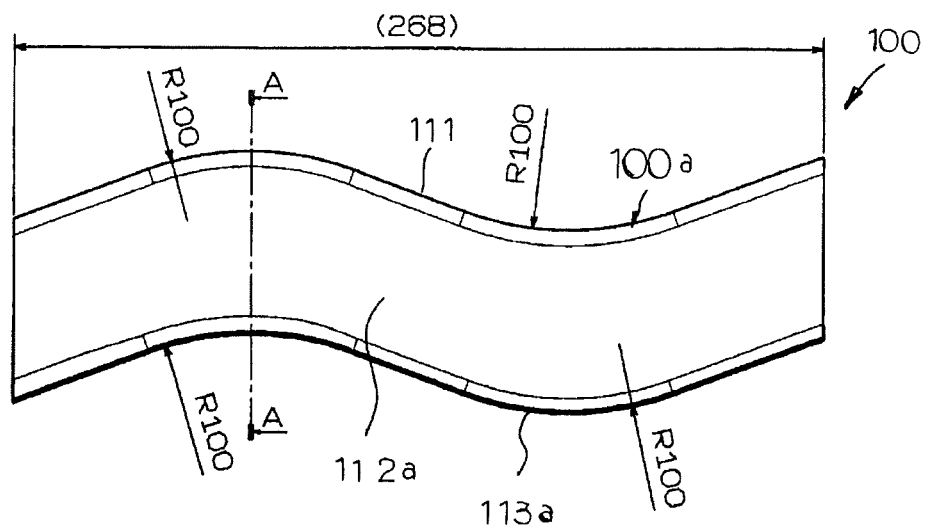
FIG. 10C is a side view of the curved part shown in FIG. 10A.
Figure 10D:
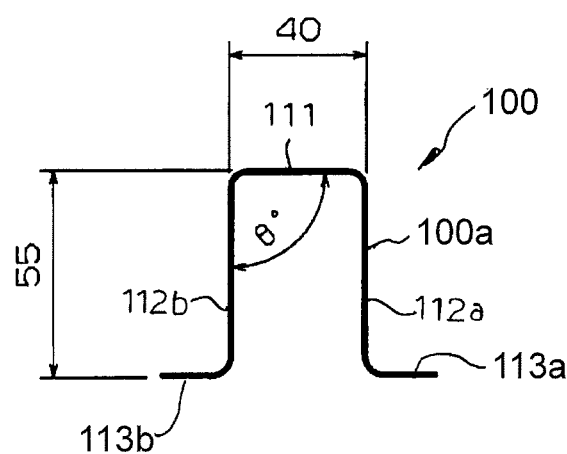
FIG. 10D is a cross-sectional view of A-A in FIG. 10C.
Figure 11:
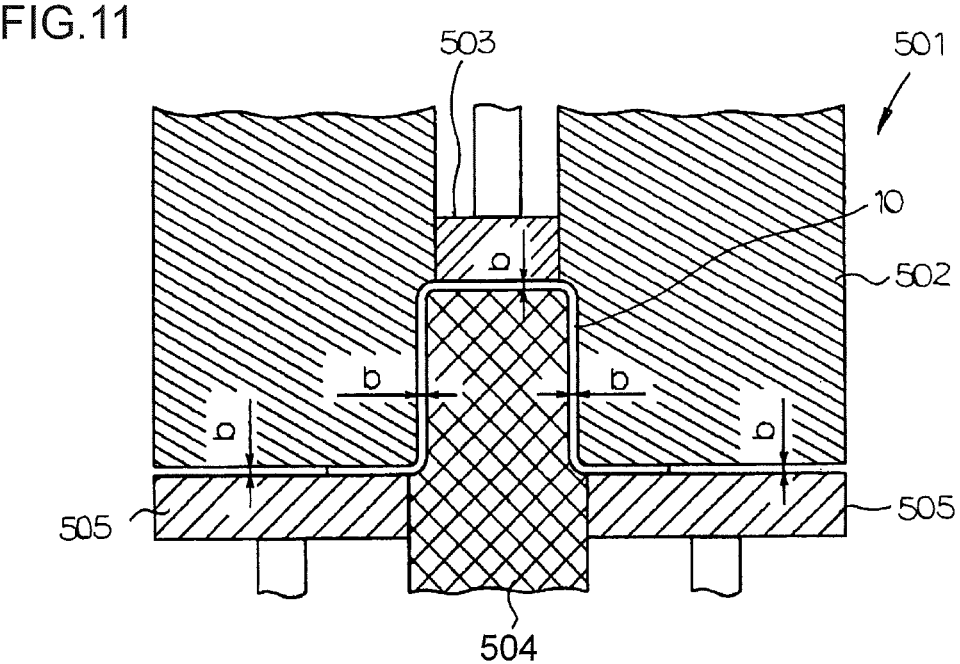
FIG. 11 is an explanatory diagram to show a clearance b in Table 1.

FIG. 10A is a perspective view to show an example of a curved part 100 which is produced by applying the present invention; FIG. 10B is a plan view seen from the above of the curved part 100; FIG. 10C is a side view of the curved part 100; and FIG. 10D is a cross-sectional view of A-A in Figure C. Further, FIG. 11 is an explanatory diagram to show a clearance b in Table 1 described below.

In FIGS. 10A to 10D, a reference symbol 100a denotes a main body, reference symbol 111a top plate, reference symbols 112a and 112b vertical walls, and reference symbols 113a and 113b outwardly directed flanges. Table 1 shows various examples, in which curved part 100 shown in FIGS. 10A to 10D is produced, in summary.

In Table 1, an angle θ is an interior angle θ formed by the vertical wall 112a, 112b and the top plate 111 as shown in FIG. 10D, and a clearance b is a gap between the pad 503 and the punch 504, between the die 502 and the punch 504, or between the die 502 and the blank holder 505.

TABLE 1

| Example | Tensile strength of material (MPa) | Sheet thickness t (mm) | θ (°) | Clearance b (mm) | b/t | Pad pressure (MPa) | Blank holder pressure (MPa) | Wrinkles |
|---|---|---|---|---|---|---|---|---|
| 1 | 980 | 1.8 | 90 | 1.8 | 1.00 | 5.83 | 2.50 | ◉ No occurrence |
| 2 | 980 | 1.8 | 91 | 1.8 | 1.00 | 5.83 | 2.50 | ◉ No occurrence |
| 3 | 980 | 1.8 | 92 | 1.8 | 1.00 | 5.83 | 2.50 | ◉ No occurrence |
| 4 | 980 | 1.8 | 95 | 1.8 | 1.00 | 5.83 | 2.50 | ○ Occurrence of wrinkles |
| 5 | 980 | 1.8 | 100 | 1.8 | 1.00 | 5.83 | 2.50 | ○ Occurrence of wrinkles |
| 6 | 980 | 1.6 | 90 | 1.8 | 1.13 | 5.83 | 2.50 | ◉ No occurrence |
| 7 | 980 | 1.4 | 90 | 1.8 | 1.29 | 5.83 | 2.50 | ○ Occurrence of wrinkles |
| 8 | 980 | 1.2 | 90 | 1.8 | 1.50 | 5.83 | 2.50 | ○ Occurrence of wrinkles |
| 9 | 980 | 1.0 | 90 | 1.8 | 1.80 | 5.83 | 2.50 | ○ Occurrence of wrinkles |
| 10 | 440 | 1.6 | 90 | 1.8 | 1.13 | 2.33 | 1.50 | ◉ No occurrence |
| 11 | 440 | 1.6 | 90 | 1.8 | 1.13 | 1.17 | 1.50 | ◉ No occurrence |
| 12 | 440 | 1.6 | 90 | 1.8 | 1.13 | 0.58 | 1.50 | ◉ No occurrence |
| 13 | 400 | 1.6 | 90 | 1.8 | 1.13 | 0.09 | 1.50 | ○ Occurrence of wrinkles |
| 14 | 440 | 1.6 | 90 | 1.8 | 1.13 | 3.50 | 1.00 | ◉ No occurrence |
| 15 | 440 | 1.6 | 90 | 1.8 | 1.13 | 3.50 | 0.75 | ◉ No occurrence |
| 16 | 440 | 1.6 | 90 | 1.8 | 1.13 | 3.50 | 0.09 | ○ Occurrence of wrinkles |

TABLE 1-continued

| Example | Tensile strength of material (MPa) | Sheet thickness t (mm) | θ (°) | Clearance b (mm) | b/t | Pad pressure (MPa) | Blank holder pressure (MPa) | Wrinkles |
|---|---|---|---|---|---|---|---|---|
| 17 | 1310 | 1.8 | 90 | 1.8 | 1.00 | 5.83 | 2.50 | ◎ No occurrence |
| 18 | 590 | 1.6 | 90 | 1.8 | 1.13 | 3.50 | 1.50 | ◎ No occurrence |
| 19 | 440 | 1.6 | 90 | 1.8 | 1.13 | 2.33 | 1.50 | ◎ No occurrence |

Any of Examples 1 to 19 in Table 1 is an inventive example of the present invention, and "occurrence of wrinkles" in Table 1 indicates that wrinkles have occurred at an allowable level, in which (1) Examples 1 to 5 are examples in which the angle θ of the vertical wall 112a, 112b is varied; (2) Examples 6 to 9 are examples in which the sheet thickness t is varied with respect to the clearance of the metal molds, more specifically, a constant clearance b, (3) Examples 10 to 13 are examples in which the pressure (pad pressure) to be applied to the pad 503 is varied, (4) Examples 14 to 16 are examples in which the pressure to be applied to the blank holder 505 is varied, and (5) Examples 17 to 19 are examples in which the tensile strength of the material is varied. The occurrence of wrinkles in the curved part 100 produced in each Example was verified.

Figure 12A:
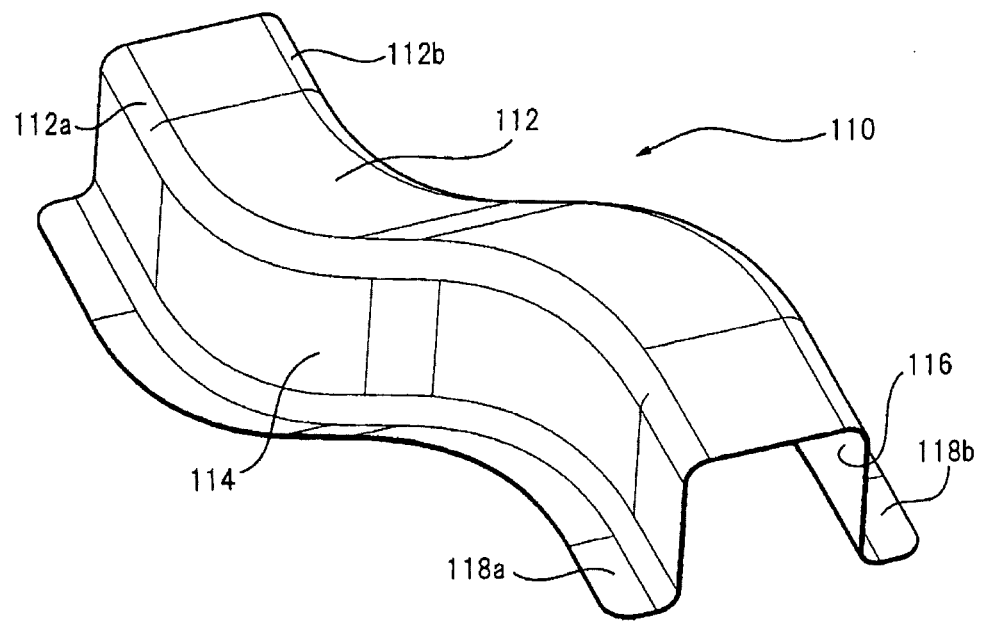
FIG. 12A is a perspective view to show another example of the curved part having a hat-shaped cross section, which is produced by applying the present invention.
Figure 12B:
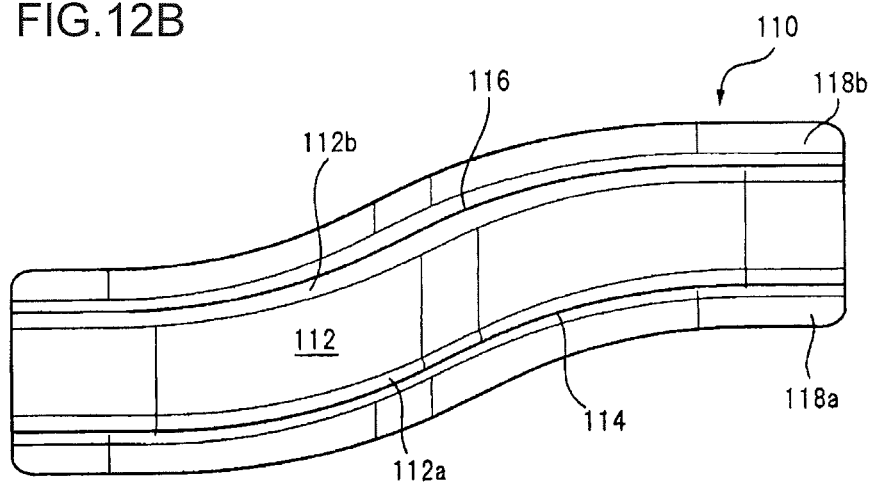
FIG. 12B is a plan view seen from above of the curved part shown in FIG. 12A.
Figure 12C:
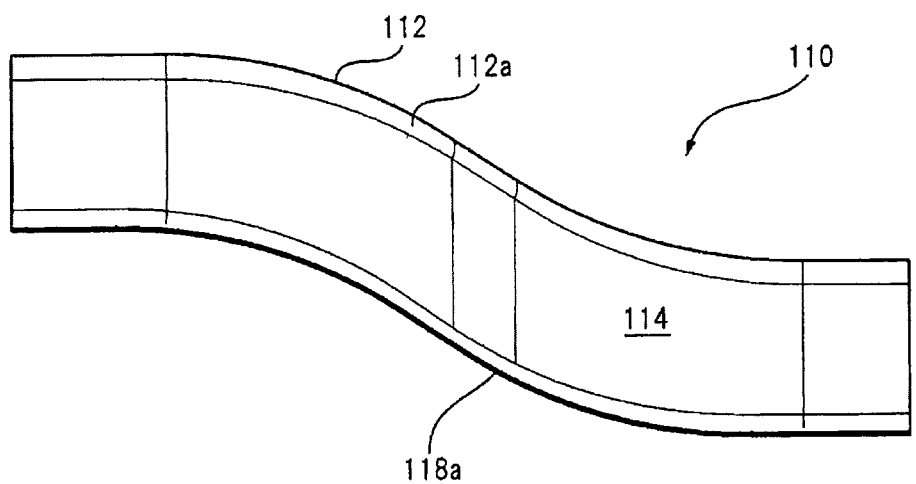
FIG. 12C is a side view of the curved part shown in FIG. 12A.
Figure 12D:
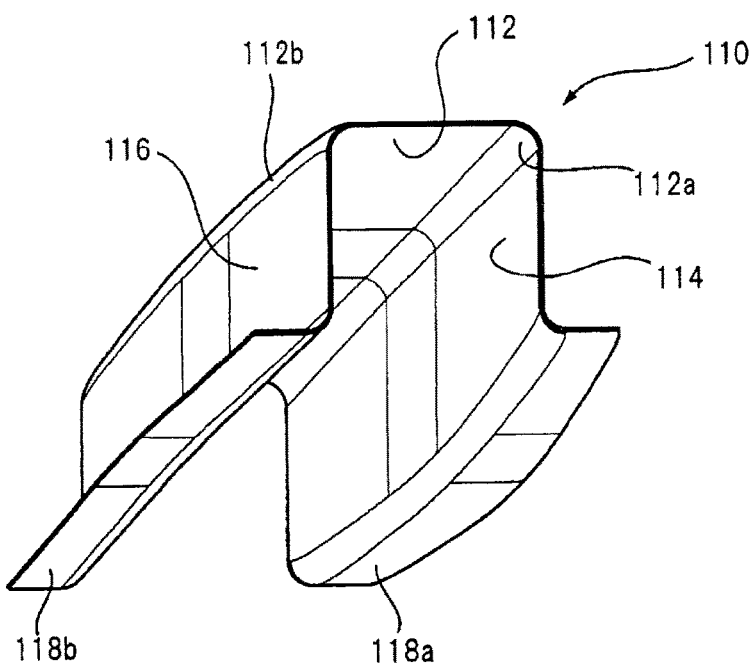
FIG. 12D is a front view seen from one end of the curved part shown in FIG. 12A.

FIG. 12A is a perspective view to show another example of a curved part 110 which is produced by applying the present invention; FIG. 12B is a plan view seen from above of the curved part 110; FIG. 12C is a side view of the curved part 110; and further FIG. 12D is a front view seen from one end of the curved part shown in FIG. 12A.

As shown in FIGS. 12A to 12D, the curved part 110 includes: a top plate 112; vertical walls 114 and 116 extended in parallel with each other along ridgelines 112a and 112b of the top plate 112; and outwardly directed flanges 118a and 118b which respectively connect to leading edges of the vertical walls 114 and 116; and has a generally hat-shaped cross section.

Moreover, the top plate 112 forms a curved surface which does not lie in one plane and is curved in a substantially S-shape. The outwardly directed flanges 118a and 118b are extended substantially in parallel with the top plate 112, and as in the top plate 112, forms a curved surface which does not lie in one plane and is curved in a substantially S-shape. The vertical walls 114 and 116 form a curved surface which does not lie in one plane and is curved in a substantially S-shape.

Figure 13A:
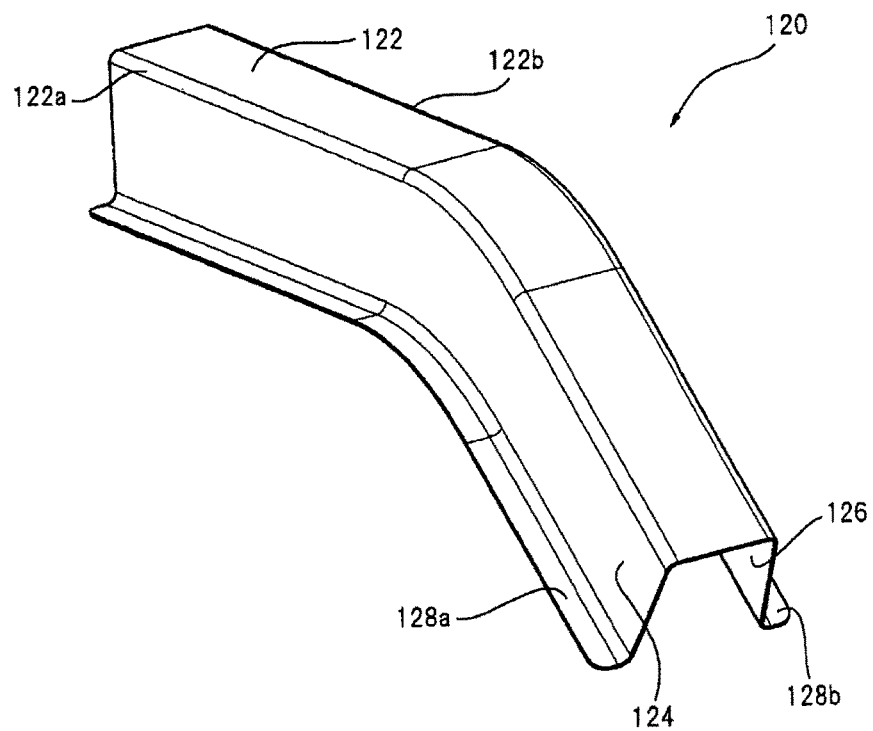
FIG. 13A is a perspective view to show another example of the curved part having a hat-shaped cross section, which is produced by applying the present invention.
Figure 13B:
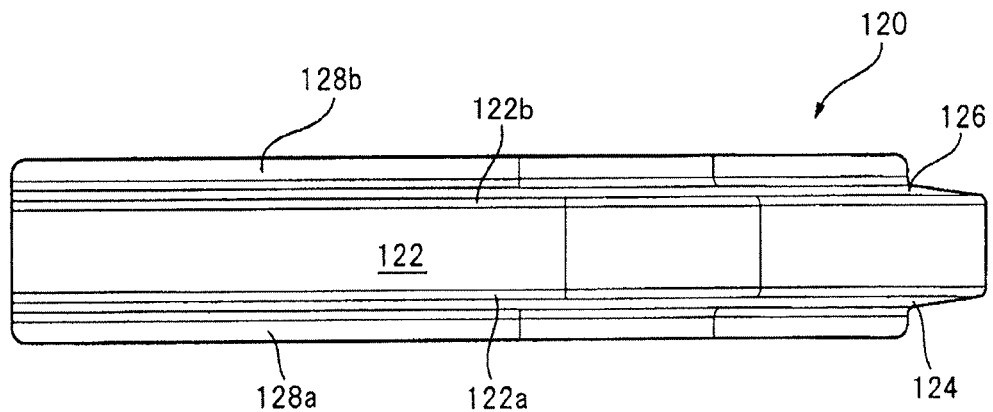
FIG. 13B is a plan view seen from above of the curved part shown in FIG. 13A.
Figure 13C:
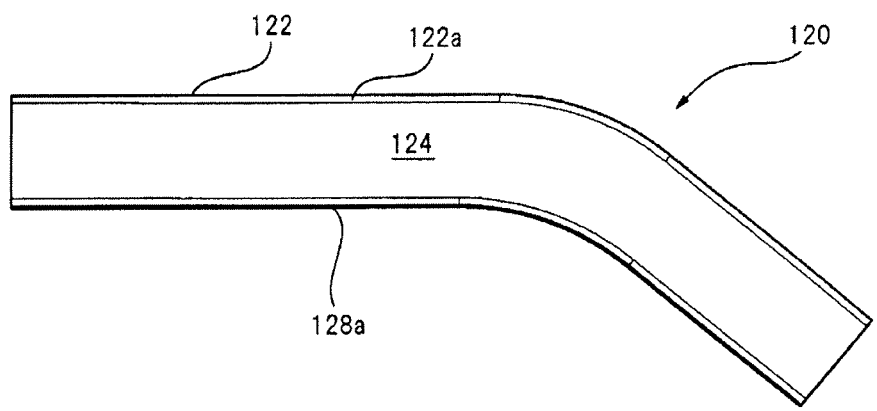
FIG. 13C is a side view of the curved part shown in FIG. 13A.
Figure 13D:
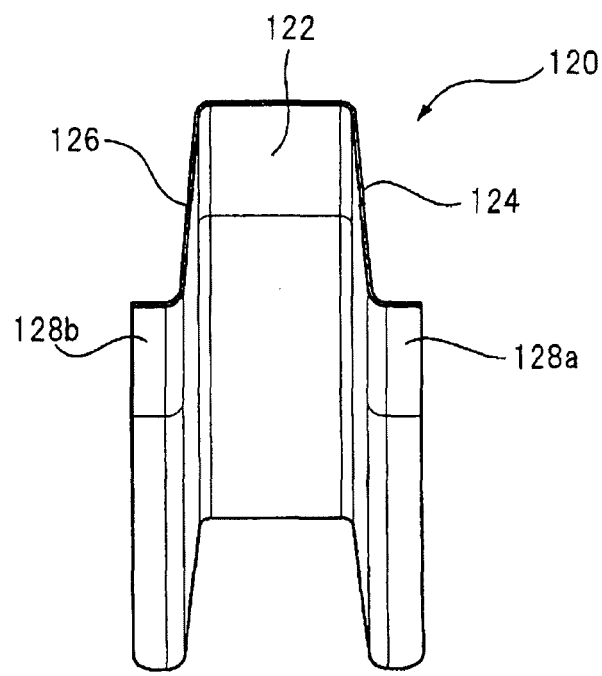
FIG. 13D is a front view seen from one end of the curved part shown in FIG. 13A.

FIG. 13A is a perspective view to show another example 120 of the curved part, which is produced by applying the present invention, FIG. 13B is a plan view seen from above of the curved part 120, FIG. 13C is a side view of the curved part 120, and further FIG. 13D is a front view seen from one end of the curved part 120.

As shown in FIGS. 13A to 13D, the curved part 120 includes: a top plate 122; vertical walls 124 and 126 extended in parallel with each other along ridgelines 122a and 122b of the top plate 122; and outwardly directed flanges 128a and 128b which respectively connect to leading edges of the vertical walls 124 and 126, and has a shape curved to the upper side in a side view as shown in FIG. 13C, that is, an outwardly bulged shape. The top plate 122 forms a curved surface which does not lie in one plane and is curved outwardly, and the outwardly directed flanges 128a and 128b are extended substantially in parallel with the top plate 122. The vertical walls 124 and 126 are made up of flat plates which are parallel with the page face of FIG. 13C.

Figure 14A:
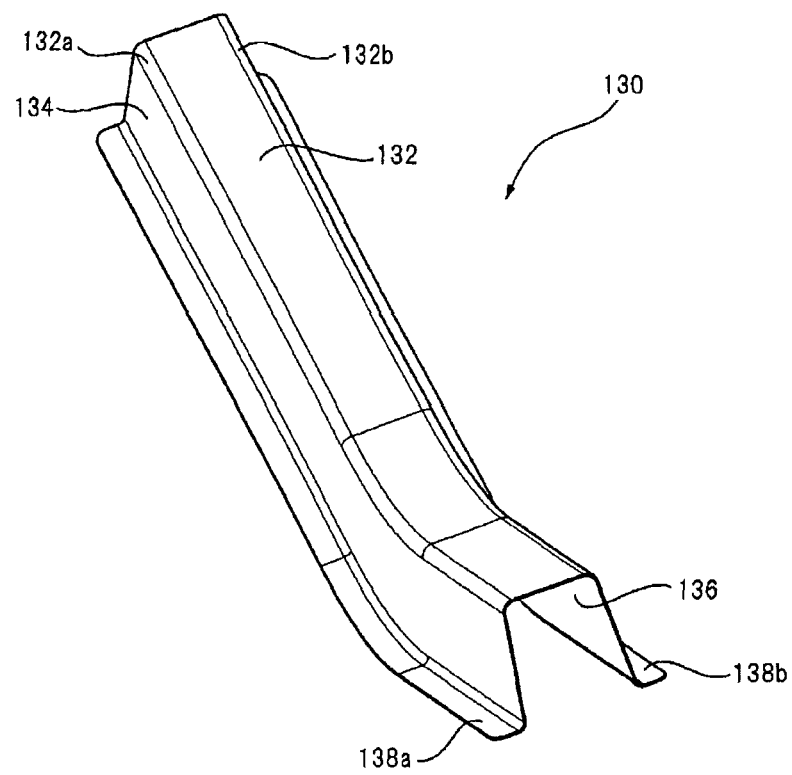
FIG. 14A is a perspective view to show a further example of the curved part having a hat-shaped cross section, which is produced by applying the present invention.
Figure 14B:
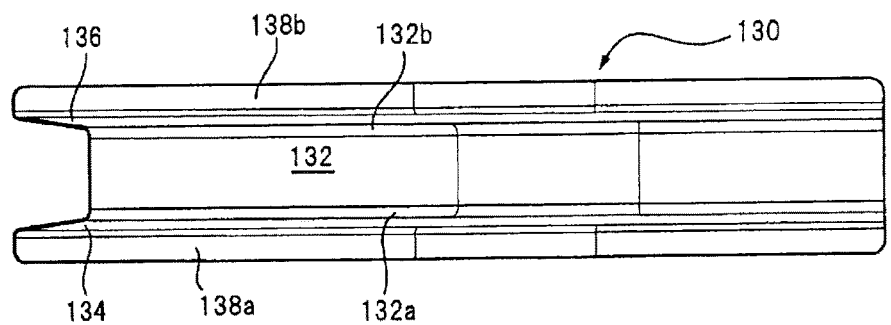
FIG. 14B is a plan view seen from above of the curved part shown in FIG. 14A.
Figure 14C:
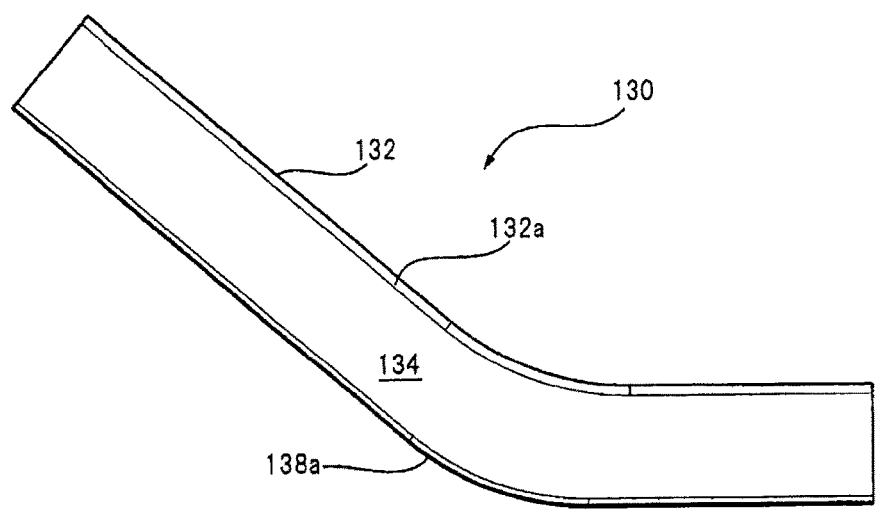
FIG. 14C is a side view of the curved part shown in FIG. 14A.
Figure 14D:
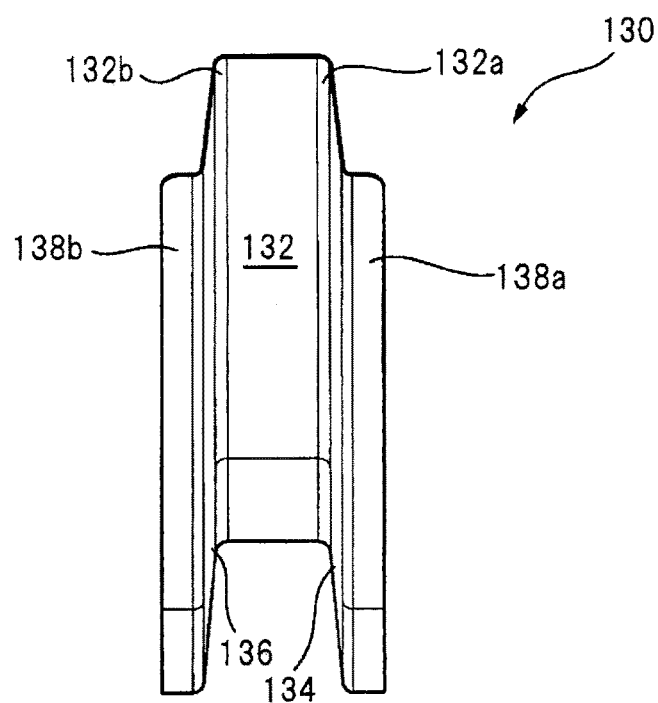
FIG. 14D is a front view seen from one end of the curved part shown in FIG. 14A.

FIG. 14A is a perspective view to show a further example 130 of the curved part, which is produced by applying the present invention, FIG. 14B is a plan view seen from above of the curved part 130, FIG. 14C is a side view of the curved part 130, and FIG. 14D is a front view seen from one end of the curved part 130.

As shown in FIGS. 14A to 14D, the curved part 130 has, in contrast to the curved part 120 shown in FIGS. 13A to 13D, a shape which is curved to the lower side in a side view, that is, an inwardly concave shape. The curved part 130 includes: a top plate 132; vertical walls 134 and 136 extended in parallel with each other along ridgelines 132a and 132b of the top plate 132; and outwardly directed flanges 138a and 138b which respectively connect to leading edges of the vertical walls 134 and 136, and has a shape curved downwardly in a side view as shown in FIG. 14C, that is, an inwardly concave shape. The top plate 132 forms a curved surface which does not lie in one plane and is curved inwardly. The outwardly directed flanges 138a and 138b are extended substantially in parallel with the top plate 132. The vertical walls 134 and 136 are made up of flat plates which are parallel with the page face of FIG. 14C.

Figure 15A:
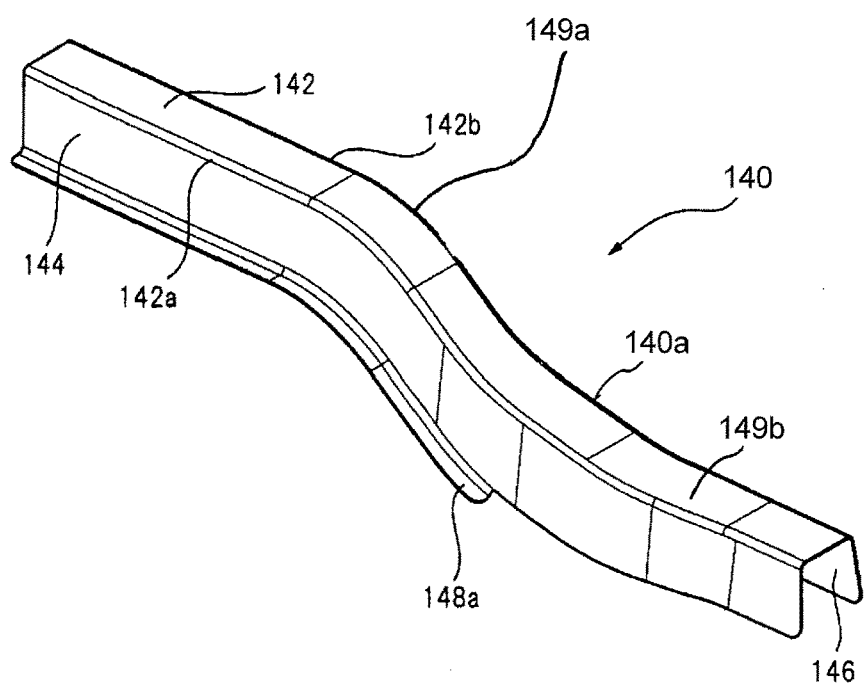
FIG. 15A is a perspective view to show a further example of the curved part having a hat-shaped cross section, which is produced by applying the present invention and in which outwardly directed flanges are extended from a part of the entire length.
Figure 15B:
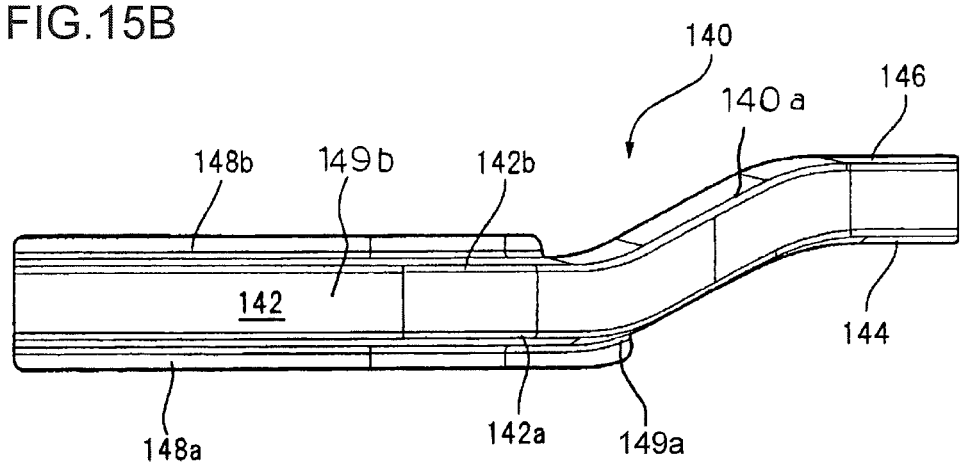
FIG. 15B is a plan view seen from above of the curved part shown in FIG. 15A.
Figure 15C:
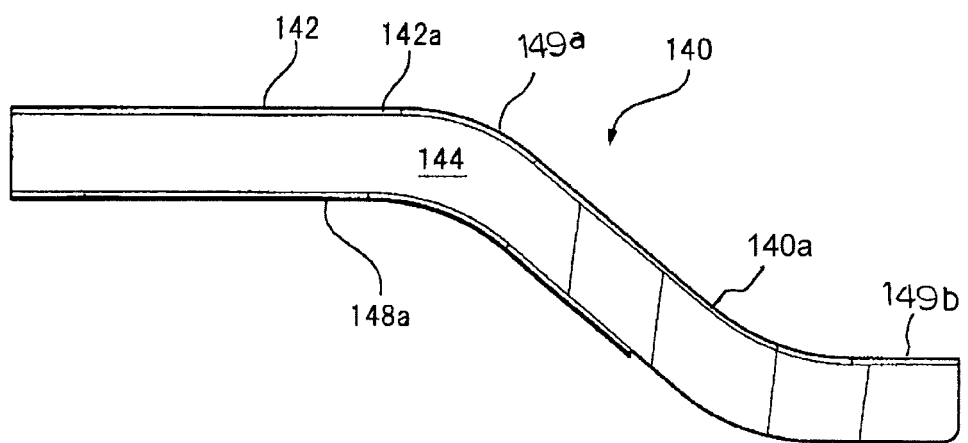
FIG. 15C is a side view of the curved part shown in FIG. 15A.
Figure 15D:
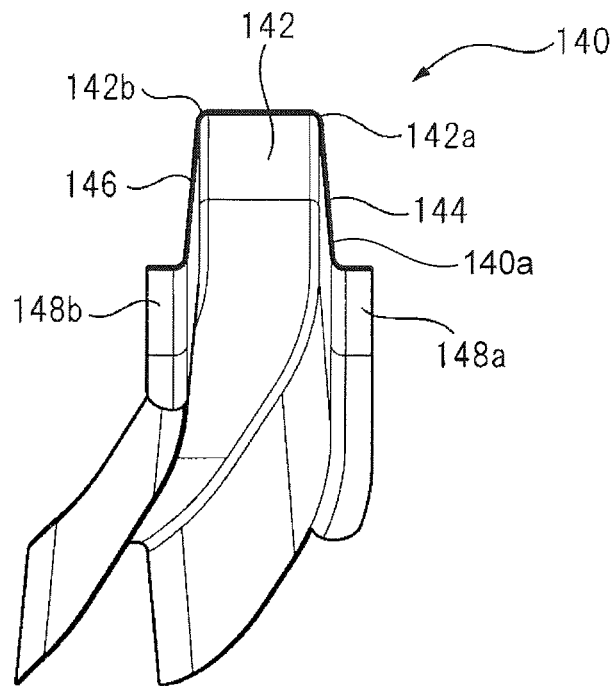
FIG. 15D is a front view seen from one end of the curved part shown in FIG. 15A.

FIG. 15A is a perspective view to show a further example of the curved part 140, which is produced by applying the present invention and in which outwardly directed flanges 148a and 148b are extended from a part of the entire length of the curved part, FIG. 15B is a plan view seen from above of the curved part 140, FIG. 15C is a side view of the curved part 140, and further FIG. 15D is a front view seen from one end of the curved part 140.

As shown in FIGS. 15A to 15D, the curved part 140 includes: a top plate 142; vertical walls 144 and 146 extended in parallel with each other along ridgelines 142a and 142b of the top plate 142; and outwardly directed flanges 148a and 148b which respectively connect to leading edges of the vertical walls 144 and 146, and has a generally hat-shaped cross section. Moreover, the top plate 142 forms a curved surface which does not lie in one plane and is curved in a substantially S-shape. The outwardly directed flanges 148a and 148b are extended substantially in parallel with the top plate 142, and as in the top plate 142, form a curved surface which does not lie in one plane and is curved in a substantially S-shape. The vertical walls 144 and 146 also form a curved surface which does not lie in one plane and is curved in a substantially S-shape.

The curved part 140 is different from the curved part 110 shown in FIGS. 12A to 12D in that the outwardly directed flanges 148a and 148b are not extended over the entire length of the vertical walls 144 and 146. That is, the vertical walls 144, 146 include a portion which does not include the outwardly directed flange 148a, 148b. In FIGS. 15A to 15D, the outwardly directed flange 148a, 148b has a length shorter than the length of the vertical walls 144, 146, from one end of the curved part 140 and along a lower edge portion of the vertical walls 144, 146. Further, although the outwardly directed flanges 148a and 148b may be configured to have the same length, they may also have different lengths as shown in FIGS. 15B and 15D.

The curved part 140 is suitably used as a rear side member which is an example of skeleton structure members constituting a body shell of automobile. The curved part 140 includes a main body 140a.

The main body 140a has a hat-shaped cross sectional shape which is made up of: an elongated top plate 142, two vertical walls 144 and 146 which connect to both side edges of the top plate 142 and extend in a direction substantially perpendicular to the top plate 142, and two outwardly directed flanges 148a and 148b which connect to a part of each of the two vertical walls 144 and 146, respectively.

Moreover, the main body 140a exhibits an external shape including a curved portion 149a in which each of the top plate 142, the two vertical walls 144 and 146, and the two outwardly directed flanges 148a and 148b is curved in an arc shape in a height direction of the vertical walls 144, 146 in a portion in the lengthwise direction of the top plate 142.

The main body 140a is a cold or warm press-formed body, which uses a steel sheet having a tensile strength of not less than 440 MPa and a sheet thickness of 1.0 to 2.3 mm as the material.

The reduction rate of the sheet thickness of the curved portion 149a with respect to that of a remaining portion 149b except the curved portion 149a is not more than 15%.

To produce a curved member 140 by a press-forming method based on the conventional draw-forming which has been described with reference to FIGS. 18 to 21, a low strength steel sheet having a tensile strength of not more than 400 MPa has to be used as the material, and the reduction rate of the sheet thickness of the curved portion 149A with respect to that of the remaining portion 149b excepting the curved portion 149a is about 20 to 35% which is very large. Although, for this reason, reinforcement of the curved portion 149a such as adding a reinforcing member has been needed, the curved member 140 obtained by the present invention has enough strength to obviate the need of reinforcing the curved portion 149a, since it can use a steel sheet having a tensile strength of not less than 440 MPa and a sheet thickness of 1.0 to 2.3 mm as the material, and the above described reduction rate of the sheet thickness is significantly suppressed to be not more than 15%.

Figure 16A:
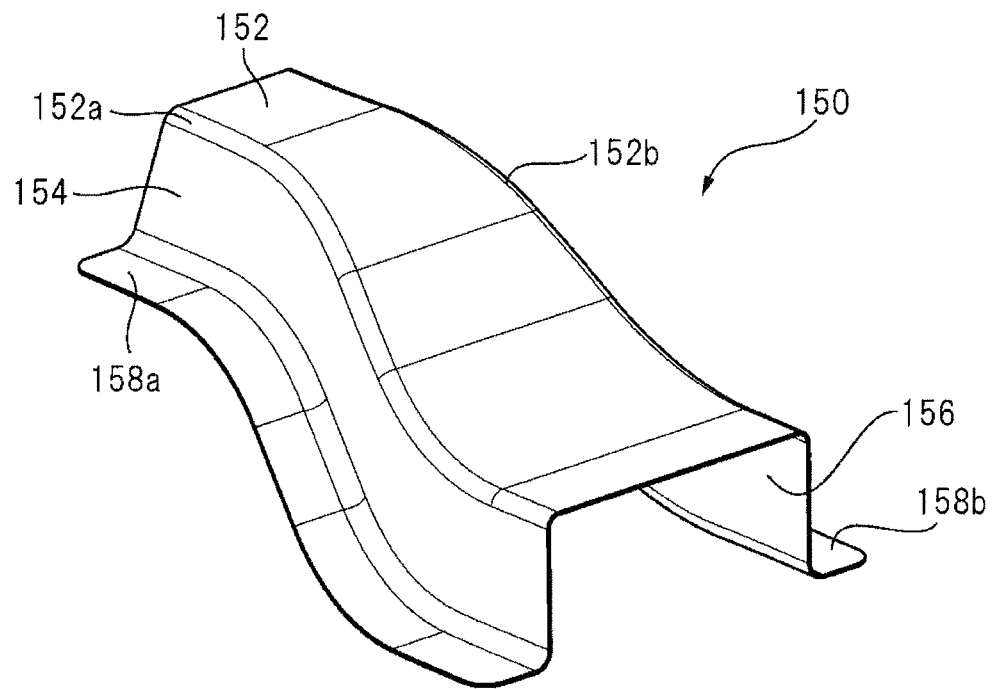
FIG. 16A is a perspective view of a curved part, which is a further example of the curved part having a hat-shaped cross section and produced by applying the present invention, and in which a top plate is enlarged from one end to the other end.
Figure 16B:
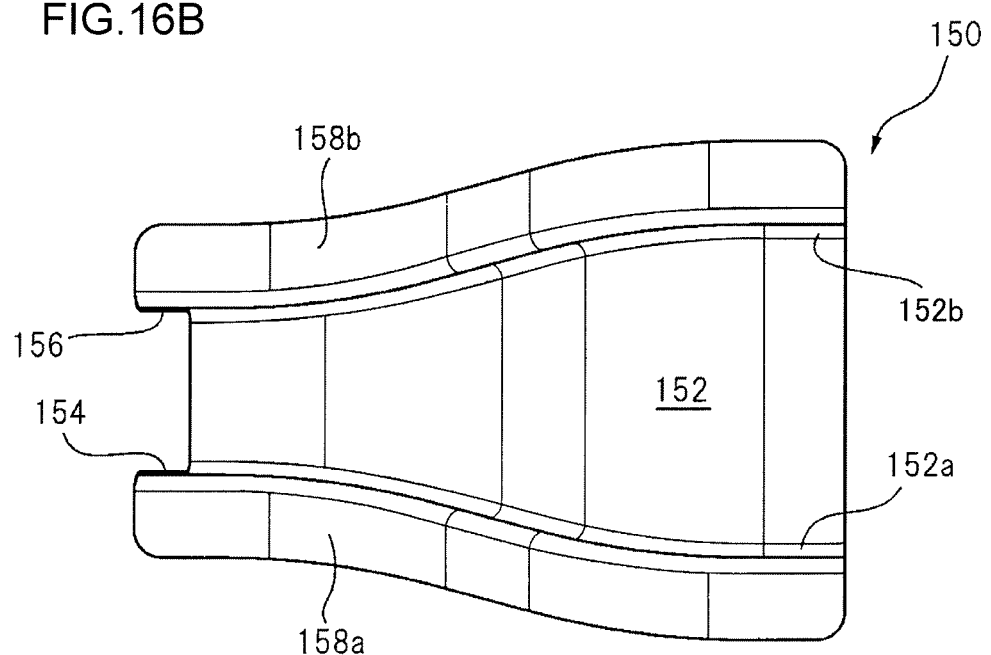
FIG. 16B is a plan view seen from above of the curved part shown in FIG. 16A.
Figure 16C:
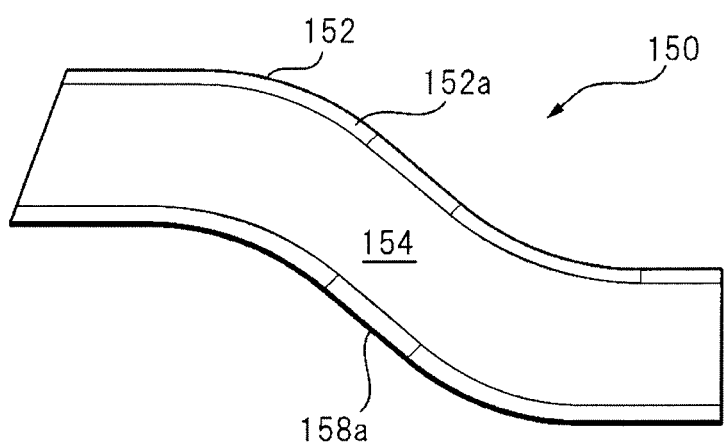
FIG. 16C is a side view of the curved part shown in FIG. 16A.
Figure 16D:
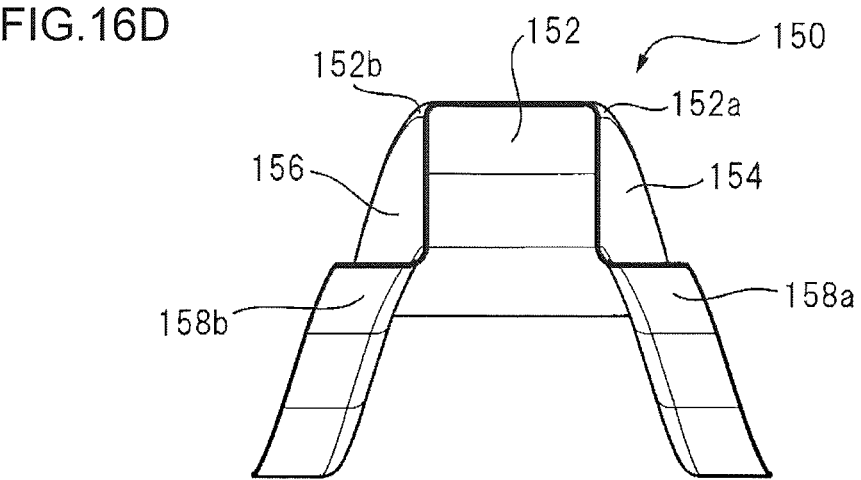
FIG. 16D is a front view seen from one end of the curved part shown in FIG. 16A.

FIG. 16A is a perspective view of a curved part 150, which is a further example of the curved part produced by applying the present invention, and in which a top plate 152 is enlarged from one end to the other end, FIG. 16B is a plan view seen from above of the curved part 150, FIG. 16C is a side view of the curved part 150, and FIG. 16D is a front view seen from one end of the curved part 150.

As shown in FIGS. 16A to 16D, the curved part 150 includes: a top plate 152; vertical walls 154 and 156 extended in parallel with each other along ridgelines 152a and 152b of the top plate 152; and outwardly directed flanges 158a and 158b which respectively connect to leading edges of the vertical walls 154 and 156, and exhibits a substantially S-shape in a side view. The top plate 152 forms a curved surface which does not lie in one plane and is curved in a substantially S-shape. The outwardly directed flanges 158a and 158b are extended substantially in parallel with the top plate 152, and as in the top plate 152, forms a curved surface which does not lie in one plane and is curved in a substantially S-shape. Each of the vertical walls 154 and 156 is curved in a substantially S-shape in a plane parallel with the page face of FIG. 21 C. Although the width of the top plate 12 is constant in the lengthwise direction in the curved part 10 of FIGS. 18A to 18E, that of the top plate 152 is enlarged from one end toward the other end of the curved part 150, in the curved part 150 of FIGS. 16A to 16D.

Figure 17A:
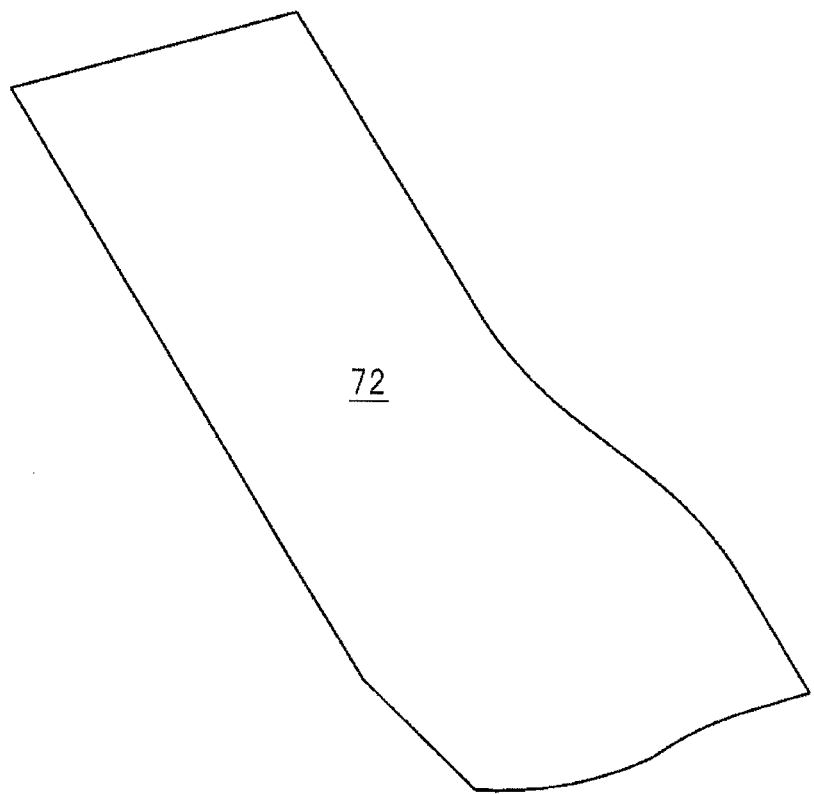
FIG. 17A is an explanatory diagram of the method of the present invention for producing a curved part by using a preworked blank, showing a perspective view of the metal material sheet to be used in this method.
Figure 17B:
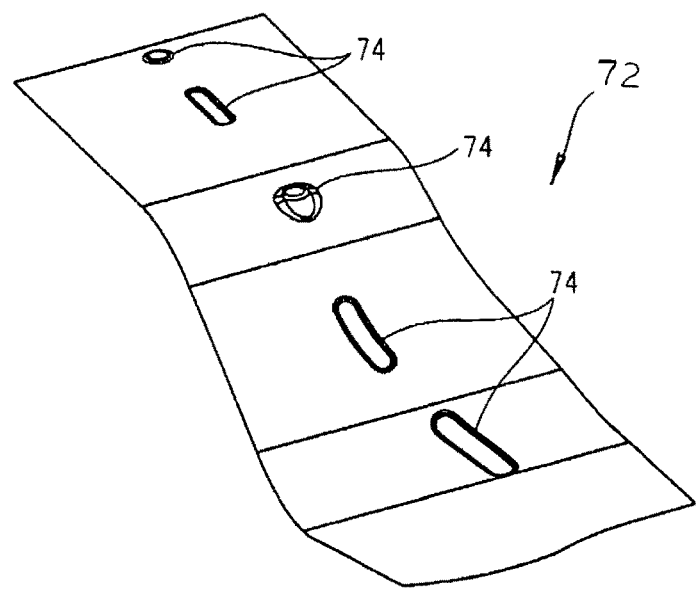
FIG. 17B is a perspective view to show a state in which the metal material sheet shown in FIG. 17A is preworked.
Figure 17C:
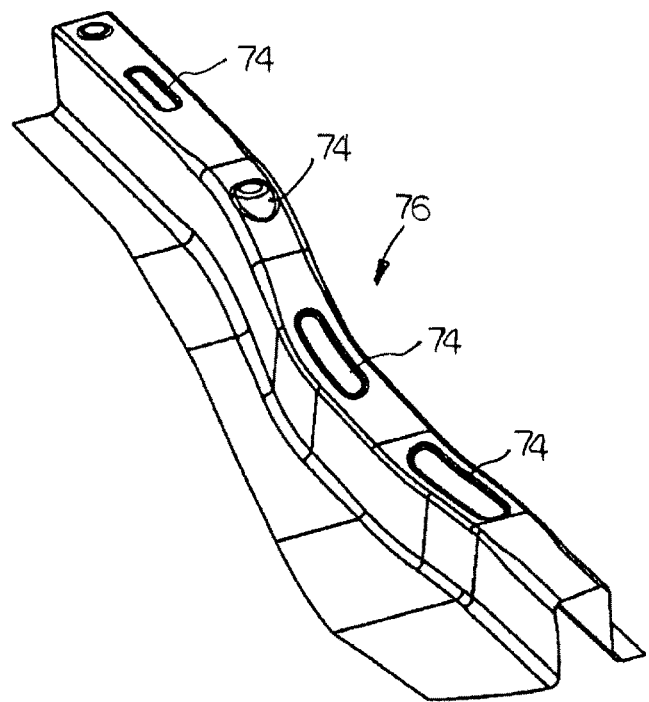
FIG. 17C is a perspective view of a curved part which is formed from the preworked metal material sheet shown in FIG. 17B.
Figure 17D:
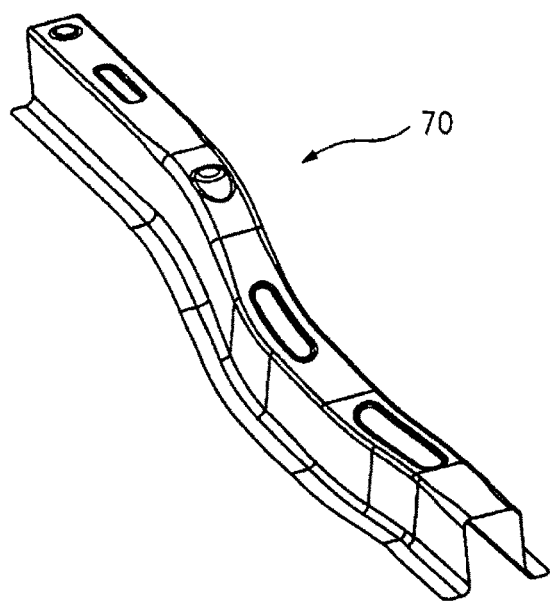
FIG. 17D is a perspective view to show the curved part shown in FIG. 17C as being further trimmed.

FIG. 17A is an explanatory diagram of the method of the present invention for producing a curved part 70 by using a preworked blank, showing a perspective view of the metal material sheet 72 to be used in this method, FIG. 17B is a perspective view to show a state in which the metal material sheet 72 is preworked, FIG. 17C is a perspective view of a curved part which is formed from the preworked metal material sheet, and further FIG. 17D is a perspective view to show the curved part shown in FIG. 17C as being further trimmed.

Further, in the present invention, the metal material sheet may be preworked, and thereafter the preworked metal material sheet may be press-formed by the above described method.

For example, the metal material sheet 72, which is cut out into a predetermined shape as shown in FIG. 17A, is preworked to form a plurality of seat surfaces 74 as shown in FIG. 17B, and thereafter the metal material sheet 72 having the plurality of seat surfaces 74 is press-formed into a press-formed body 76 by the above described method as shown in FIG. 17C.

Since, in the above described process, the top plate portion is pressed against the punch with the pad, it is preferable, to prevent the preworked seat surfaces 74 from being deformed, to provide shapes corresponding to seat surfaces 74 on each of the pad and the punch so that the metal material sheet can be pressurized and interposed without causing the seat surfaces 74 to be deformed. Moreover, after press-forming, post working such as trimming may be performed to obtain a complete product 70 as shown in FIG. 17D.

The invention claimed is:

1. A method for producing a curved part by cold or warm press-forming a metal material sheet by using a press-forming apparatus including a die and a pad, and a punch and a blank holder which are disposed to be opposed to the die and the pad, the curved part comprising a main body having: a hat-shaped cross section which is made up of an elongated top plate, two vertical walls connecting to both side edges of the top plate and extending in a direction substantially perpendicular to the top plate, and two outwardly directed flanges which connect to the two vertical walls respectively; and an external shape in which each of the top plate, the two vertical walls and the two outwardly directed flanges is curved in an arc shape in a height direction of the vertical walls in a portion in a lengthwise direction of the top plate, wherein the die has an internal shape including shapes of outer surfaces of each of the vertical walls and the flanges in the curved part, the pad has an exterior shape including a shape of an outer surface of the top plate in the curved part, the punch has an external shape including shapes of inner surfaces of each of the top plate and the vertical walls in the curved part, and the blank holder has an external shape including shapes of inner surfaces of the flanges in the curved part, and wherein the curved part having the hat-shaped cross section is formed by moving the blank holder and the die relatively with respect to the pad and the punch to a side where the punch and the blank holder are disposed with the metal material sheet as a boundary while maintaining following states at substantially the same time, and as the blank holder and the die move, the metal material sheet interposed between the blank holder and the die flows to an inner side of the die, and thereby the vertical walls are formed, in which:

a portion to be formed into the top plate in the metal material sheet, which is disposed between the pad and the punch, is held in a state in which out-of-plane deformation is inhibited by the pad and the punch while pressing against the punch with the pad so as to be pressurized and interposed, and portions to be formed into the vertical walls and the outwardly directed flanges in the metal material sheet, which are disposed between the die and the blank holder, are held in a state in which out-of-plane deformation is inhibited by the die and the blank holder while pressing against the die with the blank holder so as to be pressurized and interposed.

2. The method for producing a curved part according to claim 1, wherein the pad is connected to a pad pressurizing apparatus having a fixed stroke, and the blank holder is connected to a blank holder pressurizing apparatus, and wherein after completion of the forming of the curved part, the die and the pad are separated from the blank holder and the punch to take out the curved part from the press-forming apparatus, after the blank holder is fixed so as not to relatively move with respect to the punch and is arranged so as not to press the curved part against the die, by using the pad pressurizing apparatus and the blank holder pressurizing apparatus.

3. The method for producing a curved part according to claim 2, wherein the curved part taken out from the press-forming apparatus is subjected to postworking.

4. The method for producing a curved part according to claim 1, wherein the pad is connected to a pad pressurizing apparatus, and the blank holder is connected to a blank holder pressurizing apparatus having a fixed stroke, and wherein after completion of the forming of the curved part, the die and the pad are separated from the blank holder and the punch to take out the curved part from the press-forming apparatus, after the pad is fixed so as not to relatively move with respect to the die and is arranged so as not to press the curved part against the punch, by using the pad pressurizing apparatus and the blank holder pressurizing apparatus.

5. The method for producing a curved part according to claim 1, wherein an interior angle formed by the top plate and the vertical wall in the cross sectional shape is 90 to 92°.

6. The method for producing a curved part according to claim 1, wherein a clearance between a portion in the die which forms the vertical wall and a portion in the punch which forms the vertical wall is 100 to 120% of the sheet thickness of the metal material sheet at the time of completing the formation of the curved part.

7. The method for producing a curved part according to claim 1, wherein the metal material sheet is a steel sheet having a sheet thickness of 0.8 to 3.2 mm and a tensile strength of 200 to 1600 MPa.

8. The method for producing a curved part according to claim 1, wherein a portion of the metal material sheet to be formed into the top plate is pressurized by being pressed against the punch at a pressing pressure of not less than 0.1 MPa by the pad, and a portion of the metal material sheet to be formed into the vertical wall and the outwardly directed flange is pressurized by being pressed against the die at a pressing pressure of not less than 0.1 MPa by the blank holder.

9. The method for producing a curved part according to claim 1, wherein the metal material sheet is a preworked metal sheet which is obtained by preworking the metal material sheet.

* * * * *